United States Patent
Jung et al.

(10) Patent No.: US 9,803,880 B2
(45) Date of Patent: Oct. 31, 2017

(54) REMOTE MAINTENANCE SERVER, TOTAL MAINTENANCE SYSTEM INCLUDING THE REMOTE MAINTENANCE SERVER AND METHOD THEREOF

(71) Applicant: LG Electronics, Inc., Seoul (KR)

(72) Inventors: Seunghwan Jung, Seoul (KR); Sangwoo Lee, Seoul (KR); Juntae Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 336 days.

(21) Appl. No.: 14/683,691

(22) Filed: Apr. 10, 2015

(65) Prior Publication Data

US 2015/0308704 A1  Oct. 29, 2015

(30) Foreign Application Priority Data

Apr. 11, 2014  (KR) .......................... 10-2014-0043795

(51) Int. Cl.
*F24F 11/00* (2006.01)
*G05B 23/02* (2006.01)

(52) U.S. Cl.
CPC ........ *F24F 11/006* (2013.01); *G05B 23/0267* (2013.01); *F24F 2011/0067* (2013.01);
(Continued)

(58) Field of Classification Search
USPC ................................................ 700/295–296
See application file for complete search history.

(56) References Cited

U.S. PATENT DOCUMENTS

2004/0204793 A1  10/2004  Yoon et al.
2004/0255601 A1*  12/2004  Kwon .................. F24F 11/0086
62/157

(Continued)

FOREIGN PATENT DOCUMENTS

EP          2056032       5/2009
JP          2011-027362   2/2011
KR    10-2009-0043873    5/2009

OTHER PUBLICATIONS

International Search Report and Written Opinion of the International Searching Authority dated Jul. 13, 2015, in Application No. PCT/KR2015/003434.

(Continued)

*Primary Examiner* — Christopher E Everett
*Assistant Examiner* — Istiaque Ahmed

(57) ABSTRACT

The present disclosure discloses a remote maintenance server for remotely maintaining at least one maintenance point provided with an air conditioner having a plurality of indoor units performing air conditioning and at least one outdoor unit connected to the indoor units to drive the indoor units, the remote maintenance server including a display unit configured to display a maintenance screen for maintaining the at least one maintenance point, and a controller configured to control at least one of at least one of an operation rate for the plurality of indoor units, a set temperature, and a compression capacity of a compressor contained in the air conditioner according to a control setting value, and control the display unit to display control information which is information associated with at least one of a control status and a control result in which at least one of the control setting value, the operation rate, the set temperature and the compression capacity is controlled in a first region on the maintenance screen.

20 Claims, 13 Drawing Sheets

(52) U.S. Cl.
CPC .............. *F24F 2011/0068* (2013.01); *F24F 2011/0091* (2013.01)

(56) References Cited

U.S. PATENT DOCUMENTS

| | | | |
|---|---|---|---|
| 2006/0207269 A1* | 9/2006 | Jung | F24F 11/0086 62/130 |
| 2009/0057429 A1 | 3/2009 | Kim et al. | |
| 2011/0153107 A1 | 6/2011 | Kim et al. | |
| 2011/0218680 A1* | 9/2011 | Kim | H02J 3/00 700/276 |
| 2011/0271699 A1* | 11/2011 | Lee | F04C 23/008 62/228.4 |
| 2014/0012543 A1 | 1/2014 | Son et al. | |
| 2014/0358291 A1* | 12/2014 | Wells | G05D 23/1902 700/276 |

OTHER PUBLICATIONS

Office Action dated Aug. 24, 2015, in South Korean Patent Application No. 10-2014-0043795.

* cited by examiner

REMOTE MAINTENANCE SERVER, TOTAL MAINTENANCE SYSTEM INCLUDING THE REMOTE MAINTENANCE SERVER AND METHOD THEREOF

CROSS-REFERENCE TO RELATED APPLICATIONS

The present disclosure relates to subject matter contained in priority Korean Application No. 10-2014-0043795, filed on Apr. 11, 2014 which is herein expressly incorporated by reference in its entirety.

BACKGROUND OF THE DISCLOSURE

1. Field of the Disclosure

The present disclosure relates to a remote total maintenance system (TMS) and a remote maintenance method for remotely maintaining a plurality of control regions (or control sites) provided with a facility consuming energy.

2. Description of the Background Art

In recent years, the need for a remote maintenance system (remote total maintenance system (TMS)) for remotely maintaining a plurality of control regions (control sites, maintenance points) provided with a facility consuming energy has been recognized.

Here, the plurality of control regions may be structures or buildings disposed at various locations.

In case of conventional structure or buildings, as facilities provided therein are modernized, automatic control systems for automatically controlling sub-systems (facilities or apparatuses) such as power, lighting, conditioning, fire, security, and the like are expanded.

In line with that, the development of central monitoring systems, such as a building management system (BMS), capable of managing sub-systems in a totally integrated manner have been actively carried out.

However, the role of such a building management system is concentrated on controlling the functions of facilities provided in one building.

Accordingly, a management system for maintaining, repairing facilities provided in each building and managing an amount of energy (or power) consumption thereof is needed, and in particular, a remote total maintenance system for remotely managing a plurality of controls sites in an integrated manner has been required.

However, there is a problem that a remote total maintenance system in the related art is unable to provide a power saving feature capable of efficiently saving energy or electricity consumption for the plurality of control sites, respectively.

SUMMARY OF THE DISCLOSURE

An aspect of the present disclosure is to provide a remote maintenance server for controlling at least one of an operation rate for a plurality of indoor units, a set temperature, and a compression capacity of a compressor contained in the air conditioner according to a control setting value to efficiently reduce power consumed by a control site, and a remote total maintenance system and a remote maintenance method including the same.

In order to accomplish the foregoing objects, there is provided a remote maintenance server for remotely maintaining at least one maintenance point provided with an air conditioner having a plurality of indoor units performing air conditioning and at least one outdoor unit connected to the indoor units to drive the indoor units, and the remote maintenance server may include a display unit configured to display a maintenance screen for maintaining the at least one maintenance point, and a controller configured to control at least one of an operation rate for the plurality of indoor units, a set temperature, and a compression capacity of a compressor contained in the air conditioner according to a control setting value, and control the display unit to display control information which is information associated with at least one of a control status and a control result in which at least one of the control setting value, the operation rate, the set temperature and the compression capacity is controlled in a first region on the maintenance screen.

According to an example associated with the present disclosure, the display unit may display a control setting UI which is a graphic user interface (GUI) for receiving the control setting value in a second region on the maintenance screen.

According to an example associated with the present disclosure, the controller may control at least one of the operation rate, the set temperature and the compression capacity for a specific time period.

According to an example associated with the present disclosure, the controller may change at least one of the operation rate, the set temperature and the compression capacity in a predetermined time interval or in a periodical manner.

According to an example associated with the present disclosure, the control information may further include information on the specific time period.

According to an example associated with the present disclosure, the display unit may receive the specific time period through the control setting UI.

According to an example associated with the present disclosure, the at least one maintenance point may be a region corresponding to at least one of a structure, a building, a store, a mall and a school, which are maintained, repaired and managed by the remote maintenance server.

According to an example associated with the present disclosure, the operation rate may be a ratio between an overall number of all of the plurality of indoor units and a number of operated indoor units among the overall number of indoor units.

According to an example associated with the present disclosure, the controller may adjust an operation frequency of the compressor to control the compression capacity.

According to an example associated with the present disclosure, the at least one maintenance point may include a power meter for collecting the consumption power information from the air conditioner.

According to an example associated with the present disclosure, the remote maintenance server may further include a communication unit configured to perform communication with the at least one maintenance point, wherein the controller controls the communication unit to generate a control command for controlling at least one of the operation rate, the set temperature and the compression capacity, and transmit the generated control command to the at least one maintenance point, and the at least one maintenance point controls at least one of the operation rate, the set temperature and the compression capacity based on the control command.

According to an example associated with the present disclosure, the communication unit may acquire consumption power information consumed by the air conditioner, and the controller may generate the control command based on the acquired consumption power information.

According to an example associated with the present disclosure, the controller may compare the consumption power information with target power information, and generate the control command based on the comparison result.

According to an example associated with the present disclosure, the controller may determine at least one of the operation rate, the set temperature and the compression capacity such that an amount of consumption power consumed by the maintenance point is less than a target amount of consumption power.

According to an example associated with the present disclosure, the controller may determine at least one of the operation rate, the set temperature and the compression capacity based on an experimentally determined comfort level for the air conditioner.

According to an example associated with the present disclosure, the communication unit may perform communication with a local controller provided at each of the at least one maintenance point to control the air conditioner, and the controller may control the air conditioner through the local controller.

According to an example associated with the present disclosure, the communication unit may perform communication with the local controller in a first communication mode, and the local controller may perform communication with the air conditioner in a second communication mode.

According to an example associated with the present disclosure, the first communication mode may be at least one of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax), and the second communication mode may be RS-485.

According to an example associated with the present disclosure, the communication unit may receive a demand response control (DR) request for the at least one maintenance point from a power maintenance system, and the controller may generate the control command when the DR control request is received.

According to an example associated with the present disclosure, the controller may activate a DR control mode when the DR control request is received, and generate the control command to adjust the set temperature based on a DR control rate when the DR control mode is activated.

According to an example associated with the present disclosure, the DR control mode may be activated during a DR time period, and the controller may calculate a predicted amount of power consumption corresponding to the at least one maintenance point during the DR time period, and multiply an amount of power consumption consumed by the at least one maintenance point from a time point at which the DR control mode is activated to a specific previous time point with the DR control rate to calculate an amount of DR power, and calculate an alternate operation rate based on the predicted amount of power consumption and the amount of DR power, and set the set temperature to a different temperature in a periodically alternating manner during the DR time period based on the alternate operation rate.

According to an example associated with the present disclosure, the alternate operation rate may be 1−(the amount of DR power/the predicted amount of power consumption).

According to an example associated with the present disclosure, the specific time period may be 1 hour.

In order to accomplish the foregoing objects, a remote total maintenance system according to the present disclosure may include at least one maintenance point provided with an air conditioner having a plurality of indoor units performing air conditioning and at least one outdoor unit connected to the indoor units to drive the indoor units, and a remote maintenance server configured to remotely maintain the at least one maintenance point, wherein the remote maintenance server is a remote maintenance server corresponding to any one of the foregoing embodiments.

In order to accomplish the foregoing objects, there is provided a remote maintenance method by a remote maintenance server for remotely maintaining at least one maintenance point provided with an air conditioner having a plurality of indoor units performing air conditioning and at least one outdoor unit connected to the indoor units to drive the indoor units, and the method may include displaying a maintenance screen for maintaining the at least one maintenance point, controlling at least one of at least one of an operation rate for the plurality of indoor units, a set temperature, and a compression capacity of a compressor contained in the air conditioner according to a control setting value, and displaying control information which is information associated with at least one of a control status and a control result in which at least one of the control setting value, the operation rate, the set temperature and the compression capacity in a first region on the maintenance screen.

According to a remote maintenance server, a remote maintenance system including the remote maintenance server and a remote maintenance method according to an embodiment disclosed in the present disclosure, at least one of an operation rate for the plurality of indoor units, a set temperature, and a compression capacity of a compressor contained in the air conditioner may be controlled, thereby obtaining an advantage in which power consumed by a control site can be efficiently reduced.

Furthermore, according to a remote maintenance server, a remote maintenance system including the remote maintenance server and a remote maintenance method according to an embodiment disclosed in the present disclosure, control information which is information associated with at least one of a control status and a control result in which at least one of the control setting value, the operation rate, the set temperature and the compression capacity may be displayed on a maintenance screen of the remote maintenance server or a control setting UI which is a graphic user interface (GUI) for receiving the control setting value may be displayed on the maintenance screen, thereby obtaining an advantage in which a user can perform an energy saving function in an intuitive and efficient manner and check the execution status and result of the energy saving function.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
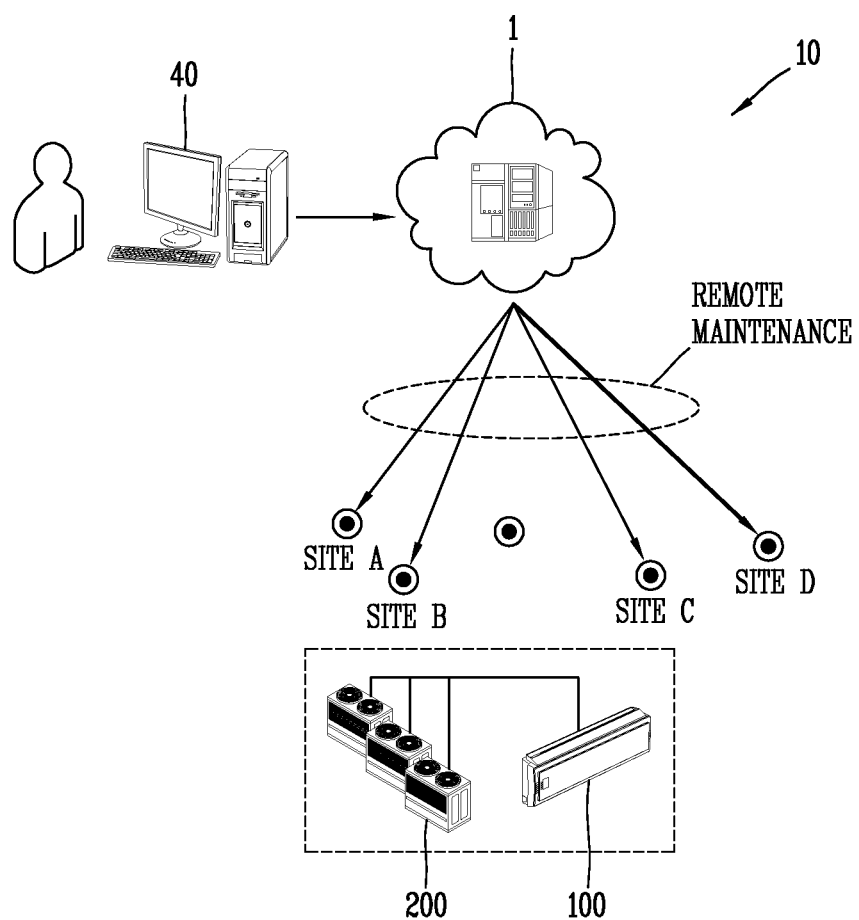
FIG. 1A is a conceptual view in the aspect of relationship between constituent elements illustrating a remote total maintenance system according to an embodiment disclosed in the present disclosure.

Technologies disclosed in the present disclosure may be applicable to a remote total maintenance system (TMS) for remotely maintaining a plurality of control regions (control sites, maintenance points) provided with a facility consuming energy.

Furthermore, technologies disclosed in the present disclosure may be also applicable to a portable device or terminal connected to the remote total maintenance system or remote maintenance server in a wired or wireless manner to remotely maintain maintenance points.

The portable device or terminal may denote a terminal in a broad sense, and may denote various devices or apparatuses, such as a digital television (TV), a smart TV, a smart phone, a portable terminal, a mobile terminal, a personal digital assistant (PDA), a portable multimedia player (PMP) terminal, a laptop computer, a Wibro terminal, an internet protocol television terminal (IPTV), a digital broadcast terminal, a telematics terminal, a navigation terminal, an audio video navigation terminal, a television, a 3D television, an audio/video (A/V) system, a home theater system, an information providing center, a call center, and the like.

The control region, control site or maintenance point may denote a maintenance object that should be collectively maintained by the center (or headquarter) or a maintenance point that should be maintained, repaired and managed by a remote maintenance server, and may have a broad concept including a structure, a building, a store, a mall and a school, and the like.

The store may denote a place where a certain article is bought and sold, and for example, the store may include a shop, a bakery, a convenience store, and the like.

Accordingly, technologies disclosed in the present disclosure may be also applicable to a remote maintenance server, a chain store maintenance system and a store maintenance method for maintenance, repair and energy management on facilities provided in a store.

The store has a concept including a chain store corresponding to a store organization for controlling a plurality of shops dealing with a plurality of goods from the center.

Accordingly, technologies disclosed in the present disclosure may be also applicable to a remote maintenance server, a chain store maintenance system and a store maintenance method for maintenance, repair and energy management on chain stores.

The main purpose of a remote maintenance server or remote maintenance system according to an embodiment disclosed in the present disclosure is to perform a maintenance and repair function for facilities or apparatuses provided in the control region.

Accordingly, the remote maintenance server or remote maintenance system may monitor the facility status of facilities to perform a maintenance and repair function on the facilities provided in the control region, thereby detecting the fault status of the facilities and carrying out maintenance on a faulty facility.

Furthermore, the remote maintenance server or remote maintenance system may perform the role of writing a report on the status of the facilities, giving an alarm on a faulty facility, and storing long-term data associated with the status of the facilities.

Furthermore, the remote maintenance server or remote maintenance system may perform a function of maintaining an amount of energy or power consumption of the facilities.

Accordingly, the remote maintenance server or remote maintenance system may perform the role of an energy maintenance system used to manage energy associated with facilities provided at a plurality of maintenance points, respectively, thereby enhancing energy performance while maintaining a comfortable indoor environment within the plurality of maintenance points.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, the embodiments disclosed herein will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Description of Remote Total Maintenance System

Hereinafter, a remote total maintenance system (or remote maintenance system) according to an embodiment disclosed in the present disclosure will be described in detail with reference to FIGS. 1 through 4.

However, a remote total maintenance system disclosed in FIGS. 1 through 4 is only illustrative, and it should be understood by those skilled in the art that technologies disclosed in the present disclosure can be applicable to various types of remote maintenance systems, point maintenance systems, store maintenance systems or chain store maintenance systems.

Figure 1B:
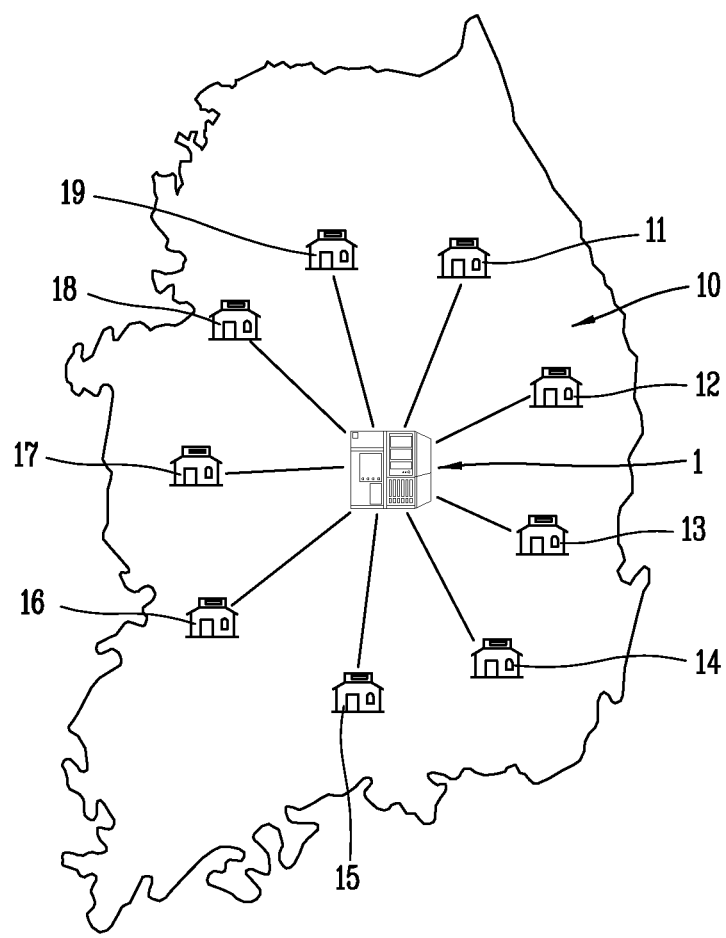
FIG. 1B is a conceptual view in the aspect of geographical location relationship between constituent elements illustrating a remote total maintenance system according to an embodiment disclosed in the present disclosure.

FIGS. 1A and 1B are conceptual views illustrating a remote total maintenance system according to an embodiment disclosed in the present disclosure.

FIG. 1A is a conceptual view in the aspect of relationship between constituent elements illustrating a remote total maintenance system according to an embodiment disclosed in the present disclosure.

Referring to FIG. 1A, a remote total maintenance system 10 according to an embodiment of the present disclosure may include at least one facility 200 consuming energy, a local controller 100 configured to control or maintain the at least one facility 200, and a remote maintenance server 1.

The remote maintenance server 1 may perform the role of maintaining, repairing and managing at least one control region, control side or maintenance point (site A~site D).

Each of the at least one control region (site A~site D) may include the at least one facility 200 consuming energy or power.

Furthermore, the at least one control region (site A~site D) may include a local controller 100 for controlling or managing the at least one facility.

The remote maintenance server 1 may remotely monitor the status of at least one facility 200 provided in the at least one control region (site A~site D), respectively, thereby performing a maintenance, repair and management function on the at least one facility 200.

Here, the status of the at least one facility 200 may be a status associated with at least one of a control setting state, an operation state and a fault state corresponding to the at least one facility 200.

Here, the control setting state may denote a control attribute or control parameter on the at least one facility 200 and denote a variable having various control objects under the control of the facility.

For example, when the facility is an air conditioner, the control setting, control attribute or control parameter may be a target temperature (or set temperature), an upper limit temperature, a lower limit temperature, a flow rate, whether it is running or stopped, and the like.

Furthermore, for example, when the facility is a lighting fixture, the control setting, control attribute or control parameter may be illumination, brightness, and the like.

The remote maintenance server 1 may detect a fault status or the like of the at least one facility 200. In this case, the remote maintenance server 1 may acquire status information on the at least one facility 200 from the local controller 100.

When a specific facility of the at least one facility 200 is failed, the remote maintenance server 1 may access a service center (specifically, service center server) (not shown) providing a service for repairing the facility to request a repair work so as to carry out repair on the specific facility.

Upon receiving a request for the repair work, the service center may carry out a work for dispatching a service technician for repair work to a control site provided with the specific facility.

Communication between the remote maintenance server 1 and the local controller 100 may be carried out in various communication modes or communication protocols.

For example, the remote maintenance server 1 and the local controller 100 may perform communication in at least one communication mode or communication protocol of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax).

Communication between the local controller 100 and the at least one facility 200 may be carried out in various communication modes or communication protocols.

For example, the local controller 100 and the at least one facility 200 may perform communication via RS-485.

Furthermore, the remote maintenance system 10 may further include an additional terminal 40 connected to the remote maintenance server 1 in a wired or wireless manner.

A user or administrator of the remote maintenance system 10 may access the remote maintenance server 1 through the additional terminal 40 to remotely maintain the at least one control region (site A~site D).

The additional terminal 40 may denote a terminal in a broad sense to have a concept containing a portable terminal. For example, the additional terminal 40 may denote various devices or apparatuses, such as a personal computer, a digital television (TV), a smart TV, a smart phone, a portable terminal, a mobile terminal, a personal digital assistant (PDA), a portable multimedia player (PMP) terminal, a laptop computer, a Wibro terminal, an internet protocol television terminal (IPTV), a digital broadcast terminal, a telematics terminal, a navigation terminal, an audio video navigation terminal, a television, a 3D television, an audio/video (A/V) system, a home theater system, an information providing center, a call center, and the like.

FIG. 1B is a conceptual view in the aspect of geographical location relationship between constituent elements illustrating a remote total maintenance system according to an embodiment disclosed in the present disclosure.

Referring to FIG. 1B, the remote total maintenance system 10 according to an embodiment of the present disclosure may perform a function of remotely maintaining control regions, control sites or maintenance points (11-19) disposed at various locations across the country.

The remote maintenance system 10 may include at least one control region (11-19) provided with a facility (or facility device) consuming energy, and the remote maintenance server 1 configured to maintain the at least one control region (11-19).

The at least one control region (11-19) may correspond to site A through site D illustrated in FIG. 1A.

The remote maintenance system 10 may having a structure in which the at least one control region (11-19) are mutually connected across the country.

As illustrated in FIG. 1B, the remote maintenance system 10 may form one network in which the at least one control region (11-19) provided with a facility device are distributed over a broad region, and connected to the remote maintenance server 1.

Here, the remote maintenance system 10 may further include a regional server (not shown) connected to at least one specific control region of the at least one control region (11-19) to maintain the specific control region, and connected to the remote maintenance server 1.

The regional server may be an additional server for relaying data between the specific control region and the remote maintenance server 1 or any one of the plurality of control regions may be operated as a server.

Here, each of the control regions (11-19) may be distributed across the country or in some areas.

Furthermore, each of the control regions (11-19) may be connected to the remote maintenance server 1, and the remote maintenance server 1 may monitor a plurality of control regions to maintain the operation.

For example, each control region may denote a maintenance object that should be collectively maintained by the center (or headquarter) or a maintenance point that should be maintained, repaired and managed by a remote maintenance server, and may have a broad concept including a structure, a building, a store, a mall and a school, and the like.

For example, when the control region is a store, the control region may be a chain store such as a convenience store, a bakery, and the like.

The remote maintenance system 10 may form at least one control region (11-19) provided with an air conditioner as well as other facility devices as a network as illustrated in FIG. 1B, thereby allowing the remote maintenance server 1 to maintain and control a plurality of control regions distributed thereover.

Here, the remote maintenance system 10 may maintain consumption power (or energy consumption) for each point in a national level as well as in a regional level, and moreover, broadly maintain it over a wide range including a plurality of countries.

Each of the at least one control region (11-19) may include one or more facilities (or facility devices) and apparatuses.

As a facility (or sub-system) provided within the control region, the facility may denote an air conditioner, a ventilator, an air conditioning unit (air handling unit), a fan, a boiler, a cooling tower, a pump, a temperature/humidity sensor, a chiller unit, a lighting fixture, a power device, a refrigerator, a freezer, a showcase, a fire system, and the like.

Furthermore, when a cooling tower system is used as a facility, for example, the apparatus may denote a cooling tower, a pump, a temperature sensor, and the like.

According to an embodiment disclosed in the present disclosure, the remote maintenance server 1 may acquire information on an amount of energy consumption during a specific time period in the at least one control region (11-19).

Here, the specific time period may be specified or set by the user.

Furthermore, the specific time period may be specified in the unit of days, weeks or months.

For example, the remote maintenance server 1 may acquire information on the amount of energy consumption per each day. Furthermore, for example, the remote maintenance server 1 may acquire information on an amount of energy consumption from January 1 to January 20.

According to an embodiment, the remote maintenance server 1 may divide the at least one control region (11-19) into at least one group (control group, maintenance group, family, control family or maintenance family) based on a specific classification criterion.

There may be a plurality of specific classification criteria. Accordingly, when there is a plurality of specific classification criteria, classification into the at least one group may be carried out on the basis of the foregoing multidimensional clustering techniques.

The classification criterion may be a classification criterion according to regional characteristics (characteristics for a control site or maintenance point) for the at least one control region (11-19).

According to an embodiment, the regional characteristics may include at least one of a static attribute and a dynamic attribute of the control region.

The static attribute may be at least one of a size of the at least one control region (11-19), a location of the at least one control region (11-19), and a facility capacity for a facility installed (or provided) in the at least one control region (11-19).

For example, an attribute for the size of the at least one control region (11-19) may denote an area, a floor height, a number of floors, and a window width, and the like of the region.

Furthermore, for example, an attribute for the location of the at least one control region (11-19) may denote a direction (east, west, south, north), a latitude, a longitude and geographical location, and the like, at which the at least one control region (11-19) is located.

Furthermore, for example, the facility capacity for a facility may denote a number of lighting fixtures, a power consumption of lighting fixture, a number of air conditioners, a capacity of air conditioner, a number of refrigeration facilities, a capacity of refrigeration facility, and the like.

Furthermore, the dynamic attribute may be weather information corresponding to a point (or region) at which the at least one control region (11-19) is located.

For example, the dynamic attribute may include at least one of daily average ambient temperature, maximum ambient temperature and minimum ambient temperature, rainfall, snowfall and cloudiness corresponding to a point (or region) at which the at least one control region (11-19) is located.

Specifically, the remote maintenance server 1 may divide the at least one control region (11-19) into a plurality of groups based on a store size (area) and a scale of lighting (number of lighting fixtures).

For example, the remote maintenance server 1 may divide the at least one control region (11-19) into a large-scale group (first group) with a large size of the control region and a large scale of the lighting, a medium-scale group (second group) with a medium size of the control region and a medium scale of the lighting, and a small-scale group (third group) with a small size of the control region and a small scale of the lighting.

In this case, each of the first to the third group may include at least one control region corresponding to this.

According to an embodiment, there may be a plurality of the classification criteria.

For example, the classification criteria may include a plurality of classification criteria for the foregoing static attribute and dynamic attribute of a control region.

In this case, the remote maintenance server 1 may apply a multidimensional clustering technique to classify the at least one control region (11-19) into the at least one group according to the plurality of classification criteria.

The multidimensional clustering technique may be carried out in various ways.

For example, the multidimensional clustering technique may be a K-means clustering technique.

The K-means clustering technique may denote a classification or clustering method of selecting a number (k) of individual clusters and criterion thereof from a plurality of data sets, and allowing the means close to the relevant criterion to belong to the relevant cluster.

In addition, it should be clearly understood by those skilled in the art that various clustering techniques can be applicable to a technology disclosed in the present disclosure.

According to an embodiment, classification into the at least one group may be carried out in various requests.

For example, the remote maintenance server 1 may periodically perform the classification work according to a user request (or user input).

Furthermore, for example, the remote maintenance server 1 may perform the classification work according to the need, and specifically for example, the remote maintenance server 1 may automatically perform the classification work when a new control region, control site or maintenance point is added.

Furthermore, for example, the remote maintenance server 1 may periodically perform the classification. Specifically, for example, the remote maintenance server 1 may perform the classification in the unit of days, weeks or months.

Considering a specific scenario of the execution of group classification according to an embodiment disclosed in the present disclosure, the remote maintenance server 1 may classify control regions into groups according to a static attribute of the foregoing classification criteria.

It is because the static attribute is not a frequently modified or changed classification criterion in terms of time, and classification is carried out only when registering a new control region.

Furthermore, the remote maintenance server 1 may reclassify the control regions in the unit of days on the basis of a classification result based on the dynamic attribute according to a dynamic attribute of the foregoing classification criteria.

It is because the dynamic attribute has a characteristic of being changed in the unit of days and periodic classification is required.

Finally, the remote maintenance server 1 may generate a control command in the unit of groups based on a final group sequentially classified based on the static attribute and the dynamic attribute to control energy or power consumption in the unit of groups.

Figure 2:
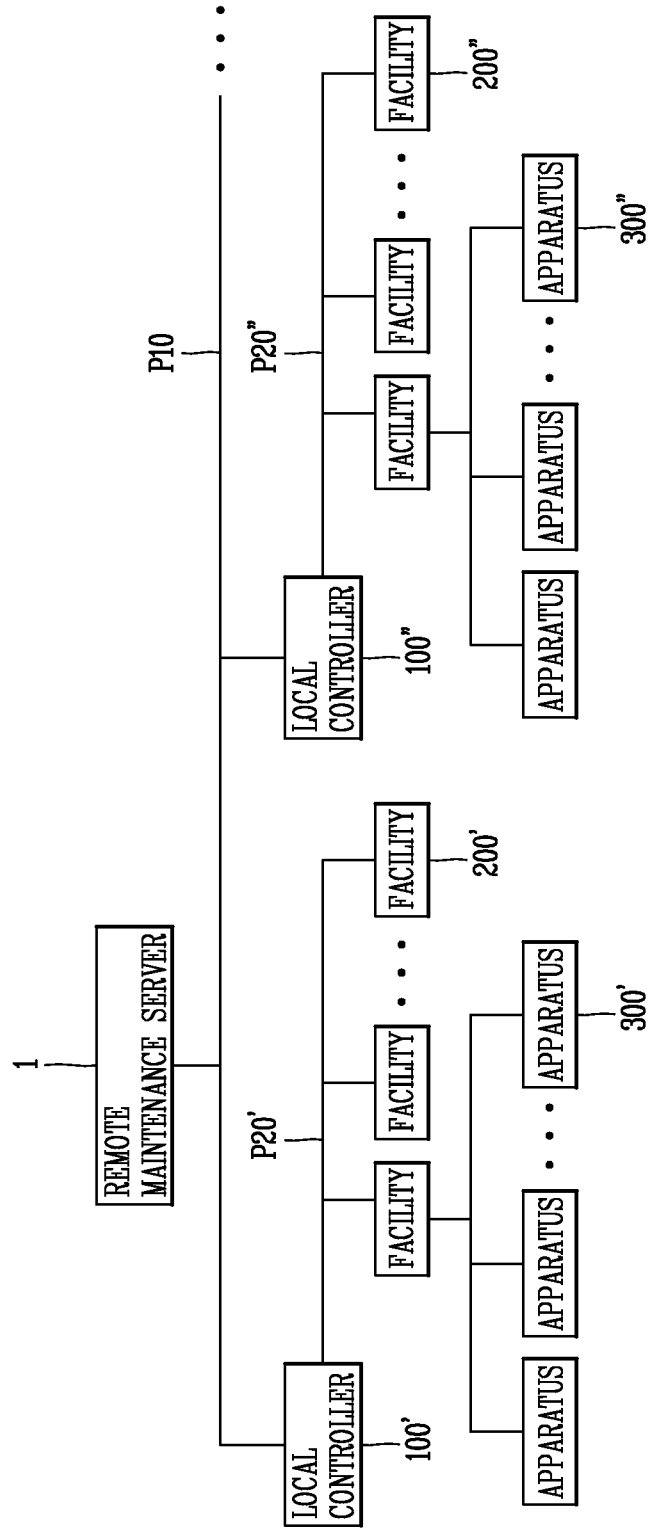
FIG. 2 is a configuration diagram illustrating the configuration of a remote maintenance system according to an embodiment disclosed in the present disclosure.

FIG. 2 is a configuration diagram illustrating the configuration of a remote maintenance system according to an embodiment of the present disclosure.

Referring to FIG. 2, the remote maintenance system (or remote total maintenance system) 10 according to an embodiment of the present disclosure may include a remote maintenance server 1, a local controller 100', 100" connected to the remote maintenance server 1 via a communication network, at least one facility 200', 200" and apparatus 300', 300".

As a sub-system constituting the remote maintenance system 10, the facility 200', 200" may denote an air conditioner, a ventilator, an air conditioning unit, a fan, a boiler, a cooling tower, a pump, a temperature/humidity sensor, a freezer, a lighting fixture, a power device, a fire system, and the like.

Furthermore, when a cooling tower system is used as a facility, for example, the apparatus 300', 300" may denote a cooling tower, a pump, a temperature senor, and the like.

As a device for comprehensively controlling, monitoring or maintaining the entire situation of a building, the remote maintenance server 1 may include the facilities 200', 200", for example, additional terminals for machine equipment, lighting, power, access control, disaster prevention, parking management, facilities management, and the like.

The remote maintenance server 1 may be an automatic server for sharing information with the local controller 100', 100" through network communication, and controlling, monitoring or maintaining the facility 200', 200" and apparatus 300', 300" contained therein.

Here, the first local controller 100' and the second local controller 100" may denote local controllers provided at different control regions, control sites or maintenance points, respectively.

According to an embodiment disclosed in the present disclosure, the remote maintenance server 1 may collect information on facilities provided or disposed in the control regions, respectively, to efficiently maintain, repair or manage each of the control regions, respectively.

For the purpose of this, the remote maintenance server 1 may provide a user interface or input/output screen capable of receiving a user input and displaying the maintenance or repair process for a facility according to the user input and processing result thereof.

The control region, control site or maintenance point may denote a maintenance object that should be collectively maintained by the center (or headquarter) or a maintenance point that should be maintained, repaired and managed by a remote maintenance server, and may have a broad concept including a structure, a building, a store, a mall and a school, and the like.

Here, the structure or building may denote an architectural structure, and may denote a mall, a convenience store, a store, a home, an office, an officetel, a factory building, a school, a hospital building, or the like.

The local controller 100', 100" may be connected to the remote maintenance server 1 via a communication network to execute a management program received from the remote maintenance server 1.

The local controller 100', 100" may be referred to as an advanced control platform (ACP) due to the role of maintaining, repairing, controlling and managing the facilities 200', 200" within the control region.

Furthermore, the local controller 100', 100" may communicate and exchange information with the remote maintenance server 1, and receive and execute the management program or a control command according to the management program to control the facilities 200', 200".

Furthermore, the local controller 100', 100" may write or store facility-related information such as control output and status change of facilities within a control region through one or more apparatuses 400, 400' provided in the facilities 200', 200", for example, sensors and manipulation devices, respectively.

The local controller 100', 100" may be a microcomputer configured to control, maintain or monitor the facility 200', 200" or apparatus 300', 300" according to the management program, for example.

In other words, the local controller 100', 100" may be connected to the remote maintenance server 1 via a communication network (P10) to transmit and receive required information with each other.

Accordingly, the local controller 100', 100" may directly control an input/output signal of the facility 200', 200" or apparatus 300', 300" to monitor, maintain or control air conditioning and other facilities provided in the control region.

Specifically, the local controller 100', 100" may be connected between the remote maintenance server 1 and the one or more facilities 200', 200" to receive a management program or a control command according to the management program to execute it.

Furthermore, the local controller 100', 100" may transmit the execution result to the remote maintenance server 1. To this end, the remote maintenance server 1 may include a communication unit as a device for transmitting the management program or a control command according to the management program and receiving an execution result according to the management program or a control command according to the management program from the local controller 100', 100".

The local controller 100', 100" may further include a display unit as a device for displaying the execution result on a user screen.

The remote maintenance server 1 and the local controller 100', 100" may be connected to each other via a communication network (P10).

According to an embodiment disclosed in the present disclosure, the communication network may include various communication protocols.

For example, the remote maintenance server 1 and the local controller 100', 100" may be at least one of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax).

Furthermore, according to an embodiment, the local controller 100', 100" may be connected to the facilities 200', 200" trough a communication network (P20', P20").

For example, the local controller 100', 100" may be connected to the facilities 200', 200" based on RS-485.

Figure 3:
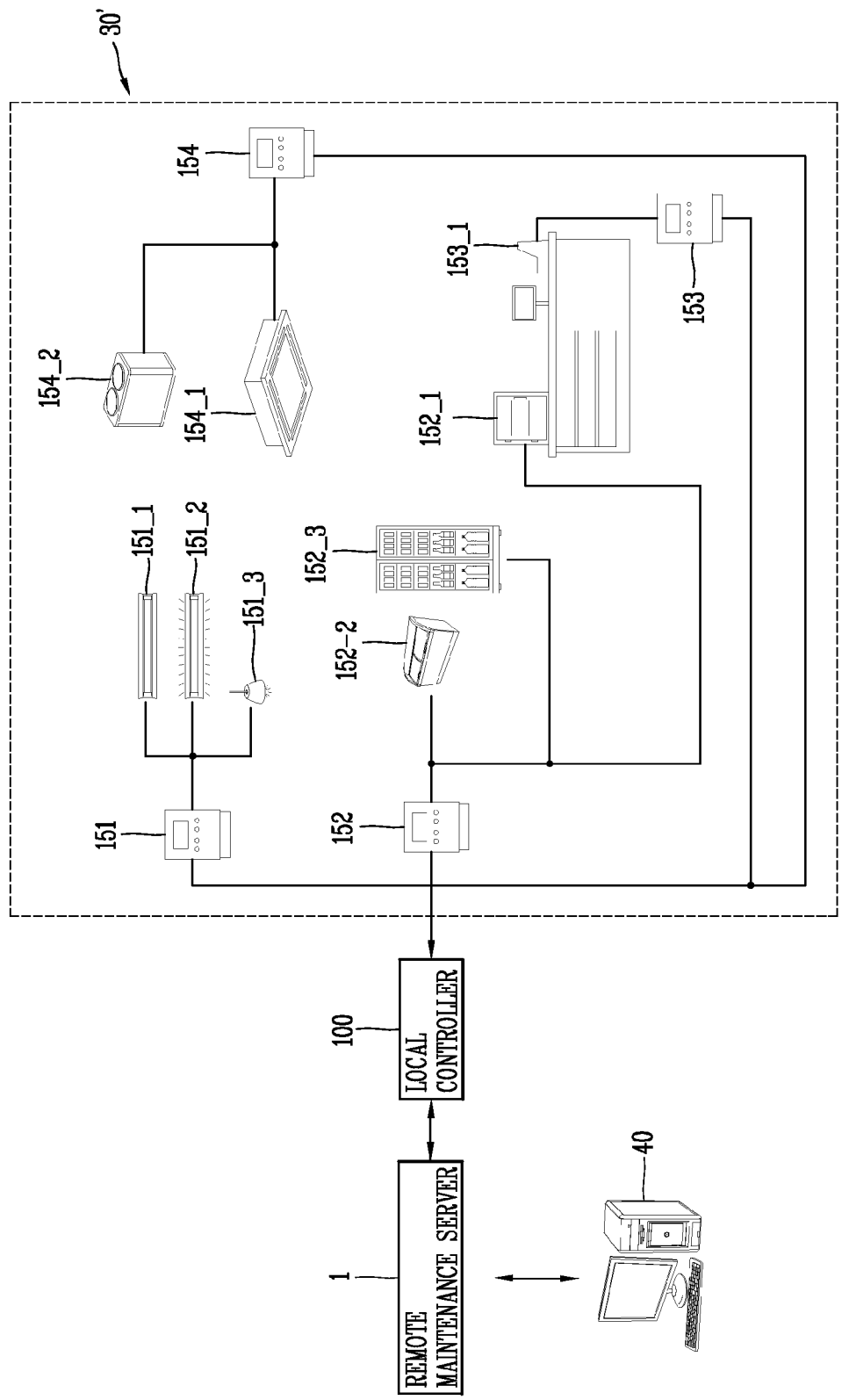
FIG. 3 is an exemplary view illustrating a specific connection relationship between a local controller and facilities or apparatuses in a remote total maintenance system according to an embodiment disclosed in the present disclosure.

FIG. 3 is an exemplary view illustrating a specific connection relationship between a local controller and facilities or apparatuses in a remote total maintenance system (remote maintenance system) according to an embodiment disclosed in the present disclosure.

Referring to FIG. 3, the remote maintenance server 1 may be connected to the local controller 100 as described above.

Furthermore, the remote maintenance server 1 may include a terminal 40 that accesses the remote maintenance server 1 from the outside.

Furthermore, a heating and cooling device, such as an air conditioner, a cooler, a heating cabinet or the like, a lighting fixture and a security device may be provided within one maintenance point or control region 30'.

Furthermore, a plurality of power meters 151 to 154 connected to the facility devices, respectively, to measure an amount of power consumption.

Here, indoor units 154-1, 151-1, 151-2, an outdoor unit 154-2, a refrigerator 152-3, a show case 152-2, a heating cabinet 152-1, a calculator 153-1, a lighting fixture 151-3 may be provided in the store.

A plurality of indoor units 154-1, 151-1, 151-2 may perform air conditioning in a room, and the plurality of indoor units may be operated in a single or combined manner according to their indoor air-conditioning loads.

Furthermore, an air conditioner may further include a unit such as a ventilator, an air purifier, a dehumidifier, a humidifier and the like in addition to the indoor units and outdoor units, but an example in which indoor units and output units are installed therein will be described below, and the number of indoor units and output units may not be necessarily limited to the drawing.

Here, the indoor unit may include an indoor heat exchanger (not shown), an indoor fan (not shown), an expansion valve (not shown) configured to expand refrigerant supplied, and a plurality of sensors (not shown).

Furthermore, the output unit may include a compressor (not shown) configured to receive and compress refrigerant, a heat exchanger (not shown) configured to exchange heat between refrigerant and outdoor air, an accumulator (not shown) configured to extract gaseous refrigerant from the supplied refrigerant and supply it to the compressor, and a 4-way valve (not shown) configured to select a passage of refrigerant according to a heating operation.

At least one lighting fixture 151-3 may be installed, and controlled by a switch connected thereto.

The refrigerator 152-3 or show case 152-2 may maintain the inside at a preset temperature to store foods.

The show case 152-2 may expose cool air according to its cooling cycle to decrease its internal temperature.

The heating cabinet 152-1 may maintain its internal temperature above a predetermined temperature, thereby maintaining things therewithin to be warm.

Furthermore, the calculator 153-1 may manage cash and issue a receipt.

For facility devices provided at a point in such a manner, data and information on power consumption for each device in an operation state for each device may be maintained through the local controller 100 (or point controller) within the maintenance point or control region.

As a device for comprehensively controlling, maintaining or monitoring the entire situation of a control region, the local controller 100 may include facility devices provided or installed in the control region, for example, additional terminals for machine equipment, lighting, power, access control, disaster prevention, parking management, facilities management, and the like.

The local controller 100 may store energy data measured and entered from power meters 151 to 154, and store control data on each device and data on the operation state.

Furthermore, the local controller 100 may be connected to the remote maintenance server 1 to transmit and receive data, and change control settings for each device, and monitor its operation according to data received from the remote maintenance server 1.

Here, a unique account may be allocated to the remote maintenance server 1 for each point (or store) to issue an ID according to the account.

The local controller 100 may access the remote maintenance server 1 through an ID which is an account of the point, thereby receiving control data for the relevant point and control records.

Here, the control data may have a broad concept including the foregoing facility control schedule or facility maintenance schedule.

The facility control schedule may include information on a setting value according to the time of a control attribute or control parameter for the foregoing facilities.

Furthermore, as a schedule for maintaining or repairing the facilities, the facility maintenance schedule may include information on a maintenance and inspection schedule, past history, and the like of the facilities.

Furthermore, as a schedule for maintaining an amount of power consumption of the facilities, the facility maintenance schedule may include information on a setting value according to the time of a control attribute or control parameter for maintaining the amount of power consumption of the facilities under a predetermined value.

The local controller 100 may transmit information on an amount of power consumption (or energy consumption) for each control region collected and stored therein to the remote maintenance server 1, and receive its resultant rate information.

Furthermore, the local controller 100 may transmit its own facility control schedule or facility maintenance schedule to the remote maintenance server 1 according to the need or according to a request of the remote maintenance server 1.

The remote maintenance server 1 may divide each control region using an account allocated to each control region and transmit the requested data.

Furthermore, the local controller in each control region may access the remote maintenance server 1 using an account allocated to itself, and request data on each control region to the remote maintenance server 1.

Here, IDs with different authorities may be allocated to the remote maintenance server 1 and each control region, respectively, and data displayed according to the authority set to an ID during an access using the ID may be displayed in a limited manner.

During an access to the remote maintenance server 1 through an ID of the control region, control site or maintenance point, only data on the relevant maintenance point may be provided from the remote maintenance server 1.

The remote maintenance server 1 may control (or maintain) a plurality of control regions, control sites or maintenance points in an integrated manner or control (or maintain) in an individual manner according to the setting, and a predetermined maintenance point may be exceptionally processed during an integrated control (or maintenance).

Furthermore, the remote maintenance server 1 may provide data for a predetermined maintenance point according to an access account in connection with an access of the terminal 40 such as a portable terminal, a laptop computer, and the like.

Here, the data of a maintenance point corresponding to the access account may be transmitted regardless of the type of the accessed terminal.

Figure 4:
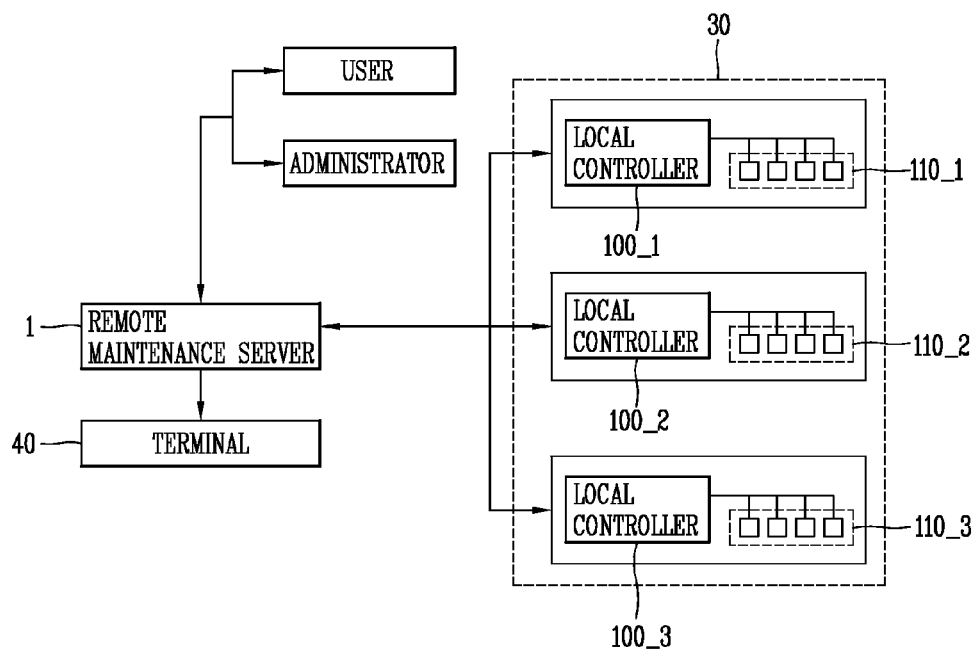
FIG. 4 is an exemplary view specifically illustrating a connection structure between a remote maintenance server and a plurality of local controllers in a remote total maintenance system according to an embodiment disclosed in the present disclosure.

FIG. 4 is an exemplary view specifically illustrating a connection structure between a remote maintenance server and a plurality of local controllers in a remote total maintenance system (or remote maintenance system) according to an embodiment disclosed in the present disclosure.

Referring to FIG. 4, a remote total maintenance system according to an embodiment disclosed in the present disclosure may include a plurality of control regions, control sites or maintenance points 30 and a remote maintenance server 1 connected to the plurality of control regions 30 via a network.

Furthermore, the plurality of control regions 30, respectively, may include local controllers 100-1 to 100-3.

The local controllers 100-1 to 100-3 may perform the role of a gateway for converting various information or communication data according to a remote communication protocol to transmit or receive the converted information or data to or from the remote maintenance server 1. In other words, the local controllers 100-1 to 100-3 may perform the function of a router for transmitting and receiving signals corresponding to the various information or communication data.

In this case, the local controllers 100-1 to 100-3 may include a protocol conversion unit (not shown) configured to convert the various information or communication data according to a remote communication protocol.

According to a modified embodiment, a remote total maintenance system according to an embodiment disclosed in the present disclosure may include a gateway (not shown) configured to perform the role of a router.

In this case, the gateway may be disposed between to remote maintenance server 1 and the local controllers 100-1 to 100-3.

The remote maintenance server 1 may include a display unit (not shown) configured to display a device maintenance screen.

Here, the device maintenance screen may be a screen for displaying any one of air conditioning information, refrigeration information, power usage information, facility information, fault history information, fault setting information, and energy usage information.

The remote maintenance system may be connected to the remote maintenance server 1 via a network, and may further include a terminal 40 configured to receive and display the device maintenance data from the remote maintenance server 1.

The plurality of control regions 30 may include at least one facility or device 110-1 to 110-3 provided within the plurality of control regions 30.

Here, the facility or device 110-1 to 110-3 may include an air conditioner, a refrigerator, a freezer, a showcase, and the like, disposed within the plurality of control regions 30, and the remote maintenance server 1 may collect status data on the at least one facility or device 110-1 to 110-3.

The status data may include information on an indoor temperature when the each facility or device 110-1 to 110-3 is an air conditioner, and on an inside temperature when the each facility or device 110-1 to 110-3 is a refrigerator, a freezer or a showcase.

Furthermore, the status data may include humidity, a flow rate as well as a current temperature.

In addition, the facility or device 110-1 to 110-3 may include a facility within the control region such as a power meter or the like, and thus the status data may include information on an amount of power consumption of the each facility or device 110-1 to 110-3 and a total amount of power consumption (or energy consumption) thereof.

The plurality of control regions 30 may include a local controller 100-1 to 100-3 configured to receive the status data from the facility or device 110-1 to 110-3.

Furthermore, the local controller 100-1 to 100-3 may be also able to transmit data for remotely controlling or maintaining the facility or device 110-1 to 110-3 from the remote maintenance server 1 to the facility or device 110-1 to 110-3.

The remote maintenance server 1 may be connected to the facility or device 110-1 to 110-3 to generate fault history data when the status data continues to be greater than a preset threshold value.

Furthermore, the remote maintenance server 1 may display the fault history data for the user or administrator through a display device when the duration of the abnormal state passes a threshold time period.

Accordingly, the remote maintenance server 1 may notify the occurrence of abnormal state of a facility or device within the control region to the user or administrator, thereby allowing the user or administrator to effectively maintain a plurality of control regions.

Furthermore, the remote maintenance server 1 may also transmit the fault history data to an administrator server or a service center providing services associated with their maintenance or repair.

Description of Remote Maintenance Server According to an Embodiment Disclosed in the Present Disclosure A remote maintenance server according to an embodiment disclosed herein may be implemented in part or a combination of the components or steps included in the foregoing embodiments or may be implemented in a combination of the foregoing embodiments. Hereinafter, overlapping portions may be omitted for clarity of the embodiment of a central maintenance server.

Accordingly, the description of a remote maintenance server overlapped with the content of the foregoing remote maintenance system will be omitted.

In particular, a remote maintenance server according to an embodiment disclosed in the present disclosure may be a maintenance server for remotely maintaining at least one maintenance point provided with an air conditioner having a plurality of indoor units performing air conditioning and at least one outdoor unit connected to the indoor units to drive the indoor units.

A remote maintenance server according to an embodiment disclosed in the present disclosure, as remote maintenance server for remotely maintaining at least one maintenance point provided with an air conditioner having a plurality of indoor units performing air conditioning and at least one outdoor unit connected to the indoor units to drive the indoor units, may include a display unit configured to display a maintenance screen for maintaining the at least one maintenance point, and a controller configured to control at least one of an operation rate for the plurality of indoor units, a set temperature, and a compression capacity of a compressor contained in the air conditioner according to a control setting value, and control the display unit to display control information which is information associated with at least one of a control status and a control result in which at least one of the control setting value, the operation rate, the set temperature and the compression capacity is controlled in a first region on the maintenance screen.

According to an embodiment, the display unit may display a control setting UI which is a graphic user interface (GUI) for receiving the control setting value in a second region on the maintenance screen.

Furthermore, according to an embodiment, the controller may control at least one of the operation rate, the set temperature and the compression capacity for a specific time period.

Furthermore, according to an embodiment, the controller may change at least one of the operation rate, the set temperature and the compression capacity in a predetermined time interval or in a periodical manner.

Furthermore, according to an embodiment, the control information may further include information on the specific time period.

Furthermore, according to an embodiment, the display unit may receive the specific time period through the control setting UI.

Furthermore, according to an embodiment, the at least one maintenance point may be a region corresponding to at least one of a structure, a building, a store, a mall and a school, which are maintained, repaired and managed by the remote maintenance server.

Furthermore, according to an embodiment, the operation rate may be a ratio between an overall number of the plurality of indoor units and a number of operated indoor units among the overall number of indoor units.

Furthermore, according to an embodiment, the controller may adjust an operation frequency of the compressor to control the compression capacity.

Furthermore, according to an embodiment, the at least one maintenance point may include a power meter for collecting the consumption power information from the air conditioner.

Furthermore, a remote maintenance server according to an embodiment may further include a communication unit configured to perform communication with the at least one maintenance point, wherein the controller controls the communication unit to generate a control command for controlling at least one of the operation rate, the set temperature and the compression capacity, and transmit the generated control command to the at least one maintenance point.

In this case, the at least one maintenance point may control at least one of the operation rate, the set temperature and the compression capacity based on the control command.

Furthermore, according to an embodiment, the communication unit may acquire consumption power information consumed by the air conditioner, and the controller may generate the control command based on the acquired consumption power information.

Furthermore, according to an embodiment, the controller may compare the consumption power information with target power information, and generate the control command based on the comparison result.

Furthermore, according to an embodiment, the controller may determine at least one of the operation rate, the set temperature and the compression capacity such that an amount of consumption power consumed by the maintenance point is less than a target amount of consumption power.

Furthermore, according to an embodiment, the controller may determine at least one of the operation rate, the set temperature and the compression capacity based on an experimentally determined comfort level for the air conditioner.

Furthermore, according to an embodiment, the communication unit may perform communication with a local controller provided at each of the at least one maintenance point to control the air conditioner, and the controller may control the air conditioner through the local controller.

Furthermore, according to an embodiment, the communication unit may perform communication with the local controller in a first communication mode, and the local controller may perform communication with the air conditioner in a second communication mode.

Furthermore, according to an embodiment, the first communication mode may be at least one of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax), and the second communication mode may be RS-485.

Furthermore, according to an embodiment, the communication unit may receive a demand response control (DR) request for the at least one maintenance point from a power maintenance system, and the controller may generate the control command when the DR control request is received.

Furthermore, according to an embodiment, the controller may activate a DR control mode when the DR control request is received, and generate the control command to adjust the set temperature based on a DR control rate when the DR control mode is activated.

Furthermore, according to an embodiment, the DR control mode may be activated during a DR time period, and the controller may calculate a predicted amount of power consumption corresponding to the at least one maintenance point during the DR time period, and multiply an amount of power consumption consumed by the at least one maintenance point from a time point at which the DR control mode is activated to a specific previous time point with the DR control rate to calculate an amount of DR power, and calculate an alternate operation rate based on the predicted amount of power consumption and the amount of DR power, and set the set temperature to a different temperature in a periodically alternating manner during the DR time period based on the alternate operation rate.

Furthermore, according to an embodiment, the alternate operation rate may be 1−(the amount of DR power/the predicted amount of power consumption).

Furthermore, according to an embodiment, the specific time period may be 1 hour.

In an aspect of a remote total maintenance system, a technology disclosed in the present disclosure may relate to a remote total maintenance system including at least one maintenance point provided with an air conditioner having a plurality of indoor units performing air conditioning and at least one outdoor unit connected to the indoor units to drive the indoor units, and a remote maintenance server configured to remotely maintain the at least one maintenance point, wherein the remote maintenance server is a remote maintenance server corresponding to any one of the foregoing embodiments.

Figure 5:
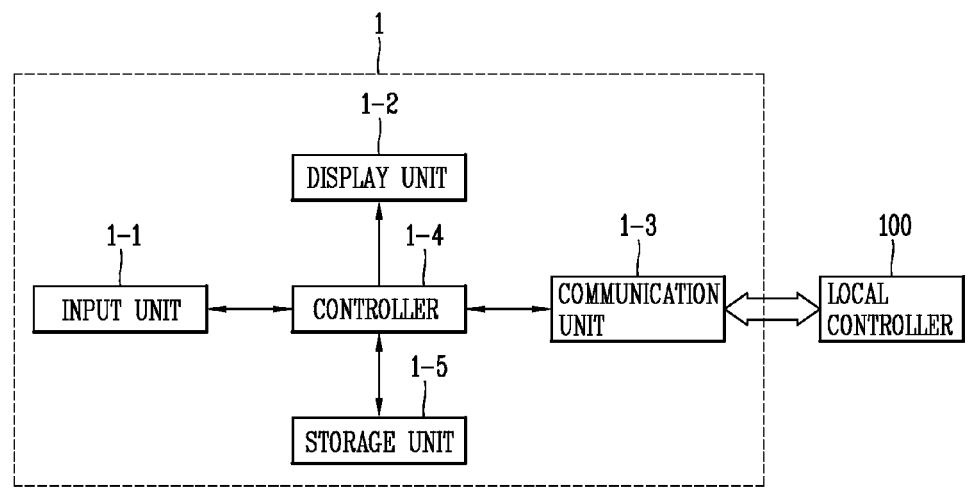
FIG. 5 is a configuration diagram illustrating the configuration of a remote maintenance server according to an embodiment disclosed in the present disclosure.

FIG. 5 is a configuration diagram illustrating the configuration of a remote maintenance server according to an embodiment disclosed in the present disclosure.

Referring to FIG. 5, the remote maintenance server 1 according to an embodiment disclosed in the present disclosure may include a compression unit 1-3 and a controller 1-4.

Furthermore, according to an embodiment, the remote maintenance server 1 may further include an input unit 1-1, a display unit 1-2, and a storage unit 1-5.

In addition, the remote maintenance server 1 may further include various constituent elements for a remote maintenance function according to an embodiment disclosed in the present disclosure.

The constituent elements illustrated in FIG. 5 are not necessarily required, and the remote maintenance server 1 may be implemented with greater or less number of elements than those illustrated elements.

Hereinafter, the constituent elements will be described in sequence.

However, overlapping portions with the content associated with the remote maintenance server 1 disclosed in FIGS. 1 through 4 may be omitted.

First, the remote maintenance server 1 may perform a function of remotely maintaining at least one maintenance point provided with an air conditioner having a plurality of indoor units performing air conditioning and at least one outdoor unit connected to the indoor units to drive the indoor units.

The communication unit 1-3 may perform the role of performing communication with at least one maintenance point 30 provided with a facility consuming energy.

Each of the at least one maintenance point 30 may include a local controller (or local maintenance unit) 100 for controlling or maintaining the facility.

In this case, the communication unit 1-3 may perform communication with the local controller 100 contained in the at least one maintenance point 30, respectively.

In other words, the communication unit 1-3 may be provided at the at least one maintenance point 30, respectively, to perform communication with the local controller 100 for controlling at least one facility provided at the at least one maintenance point 30, respectively.

Here, each of the at least one maintenance point 30 may be a region corresponding to at least one of a structure, a building, a store, a mall and a school, which are maintained, repaired and managed by the remote maintenance server.

The at least one maintenance point 30 may be referred to as a control site, a maintenance site, a control region, or the like.

According to an embodiment, the communication unit 1-3 may transmit a control command generated by the controller 1-4 to the at least one maintenance point.

According to an embodiment, the control command may be a command for controlling at least one of an operation rate for the plurality of indoor units, a set temperature, and a compression capacity of a compressor contained in the air conditioner according to a control setting value.

In this case, the at least one maintenance point 30 may control at least one of the control setting value, the operation rate, the set temperature and the compression capacity.

The at least one maintenance point 30 may acquire information on an energy usage (an amount of power consumption or amount of consumption power) during a specific time period, respectively.

For example, the communication unit 1-3 may communicate with the local controller 100 to acquire information on the energy usage.

In this case, the control command may be generated based on the acquired amount of consumption power.

The communication unit 1-3 may be provided at the maintenance point 30, respectively, to perform communication with the local controller 100 for controlling the air conditioner, and the controller 1-4 may control the air conditioner through the local controller.

As described above, the local controller 100 may perform the role of a gateway, the communication unit 1-3 may perform communication with the local controller 100 through an additional gateway connecting between the remote maintenance server 1 and the local controller 100.

Here, the specific time period may be specified in the unit of days, weeks or months.

The communication unit 1-3 may perform communication with the local controller 100 in a first communication mode.

Furthermore, the local controller 100 may perform communication with the at least one facility in a second communication mode.

Here, the first communication mode may be at least one of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax).

Furthermore, the second communication mode may be RS-485.

According to an embodiment, the communication unit 1-3 may receive a demand response (DR) control request for the at least one maintenance point 30 from a power maintenance system (not shown).

In this case, the controller 1-4 may generate the control command when the DR control request is received.

The power maintenance system may be a system operated by a power company. For example, the power company may be Korea Electric Power Corporation, in case of a domestic company.

Considering the DR (demand response or demand maintenance) in brief, the DR may be a system derived by the need of an effective energy policy establishment in an energy consuming society.

The DR which is a demand maintenance may reasonably adjust power demand, thereby having an advantage of promoting cost reduction and stable power supply through the enhancement of a load factor as well as contributing to national energy savings.

According to an embodiment, the demand maintenance may include midnight electricity utilization, maximum demand power control, direct load control, remotely-controlled air conditioning and time-based pricing, and the like.

The demand response or demand maintenance refers to allowing an end customer to use power away from daily consumption patterns in response to a price or monetary compensation or instruction of the power company.

In general, power companies may provide monetary compensation to allow an end customer to reduce power consumption in order to cope with situations such as an increase in wholesale market prices or threatening system reliability.

According to an embodiment, the demand response or demand maintenance may include time-based pricing for inducing end customers to voluntarily reduce electricity consumption due to economic incentives such as electricity cost savings through a method of paying expensive rates during a time zone in which a reduction in electricity use is required since the power demand reaches its peak as well as paying inexpensive rates during the rest of the time zone.

Furthermore, the demand response or demand maintenance may include incentive payment for allowing a system administrator who should maintain a balance between real-time supply and demand to directly provide a predetermined incentive, thereby inducing end customers who reduce electricity consumption during a time zone in which a reduction in electricity use is required since the power demand reaches its peak to reduce electricity consumption.

Accordingly, the DR control request may denote a power consumption control or maintenance request to the at least one maintenance point 30 based on the time-based pricing or incentive payment.

Figure 6:
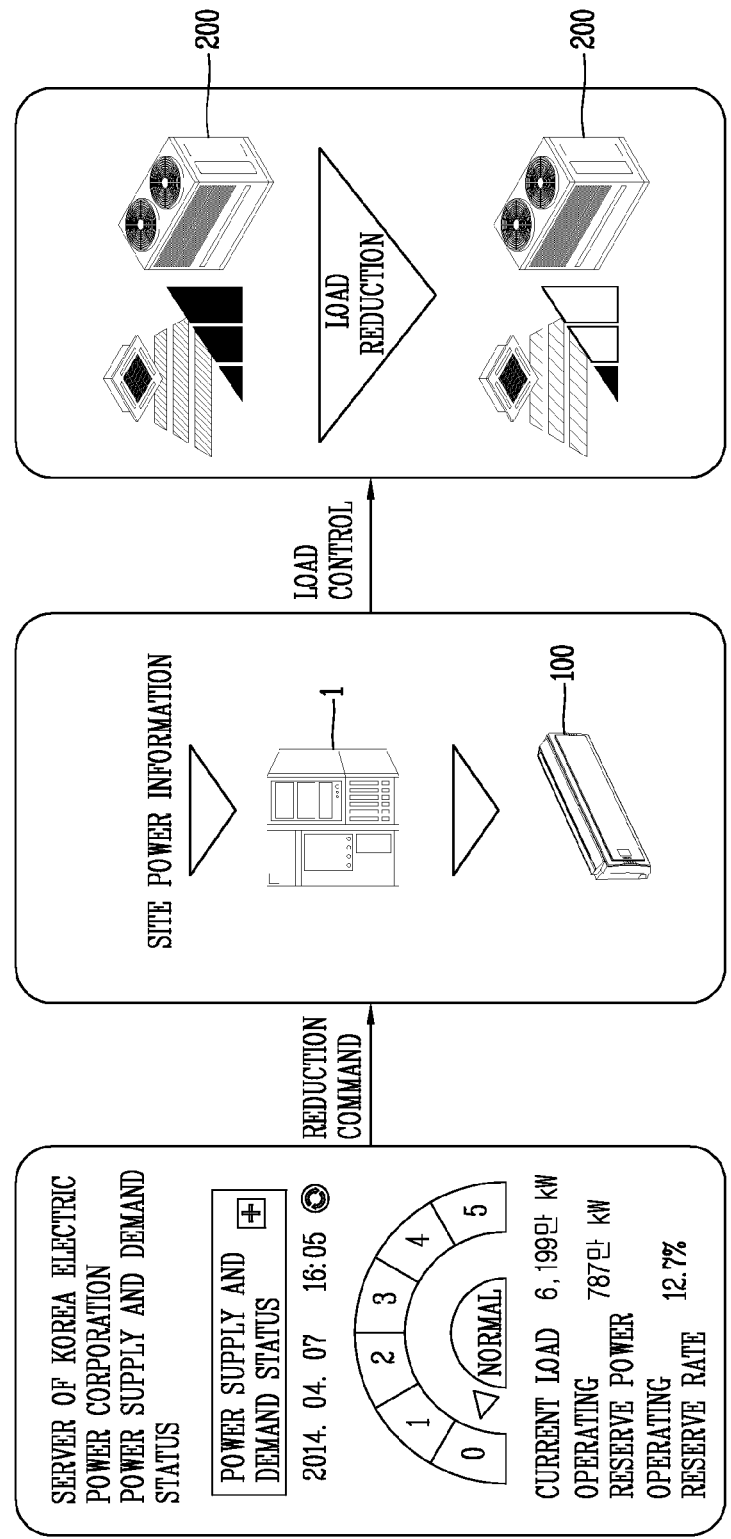
FIG. 6 is a conceptual view illustrating DR control according to an embodiment disclosed in the present disclosure.

FIG. 6 is a conceptual view illustrating DR control according to an embodiment disclosed in the present disclosure.

Referring to FIG. 6, a server (for example, a server of the Korea Electric Power Corporation) of a power company (for example, Korea Electric Power Corporation) who maintains an amount of power may know a whole power supply and demand status (for example, a power supply and demand status for the at least one maintenance point).

The server of the Korea Electric Power Corporation may transfer a reduction request which is a DR control request to the remote maintenance server 1 according to an embodiment disclosed in the present disclosure according to the need based on the known power supply and demand status.

The remote maintenance server 1 may perform load control through the local controller 100 provided at each maintenance point to reduce its load.

The load control may be carried out by controlling at least one of an operation rate for the plurality of indoor units 200, a set temperature, and a compression capacity of a compressor contained in the air conditioner.

According to an embodiment, upon receiving the DR control request, the controller 1-4 may activate a DR control mode, and may generate the control command to adjust the set temperature based on the DR control rate when the DR control mode is activated.

Here, the DR control mode may be activated during a DR time period.

In this case, the controller 1-4 may calculate a predicted amount of power consumption corresponding to the at least one maintenance point during the DR time period, and multiply an amount of power consumption consumed by the at least one maintenance point from a time point at which the DR control mode is activated to a specific previous time point with the DR control rate to calculate an amount of DR power, and calculate an alternate operation rate based on the predicted amount of power consumption and the amount of DR power, and set the set temperature to a different temperature in a periodically alternating manner during the DR time period based on the alternate operation rate.

According to an embodiment, the alternate operation rate may be 1−(the amount of DR power/the predicted amount of power consumption).

According to an embodiment, the specific time period may be 1 hour.

The DR control mode will be described later with reference to FIG. 10.

According to another embodiment, the communication unit 1-3 may perform communication with a data center server (not shown) for collecting information on the amount of energy consumption from the at least one maintenance point 30 to acquire information on the amount of energy consumption.

Here, the data center server may be a constituent element corresponding to a power maintenance server included in the foregoing power maintenance system.

Accordingly, the communication unit 1-3 may directly acquire power consumption information from the at least one maintenance point 30, respectively, but also indirectly acquire the power consumption information from the power maintenance system for collecting power consumption information from the at least one maintenance point 30, respectively.

According to an embodiment, specifically, the remote maintenance server 1 may determine whether a reduction in the amount of power consumption is required based on the power consumption information acquired from the controller 1-4 and the communication unit 1-3, and generate the control command when a reduction in the amount of power consumption is required.

According to another embodiment, the power maintenance system may generate the DR control request based on the power consumption information collected by the power maintenance system itself, and the remote maintenance server 1 may generate the control command when the 104 and the communication unit 1-3 has received the DR control request.

The display unit 1-2 may display information processed in the remote maintenance server 1.

For example, the display unit 1-2 may display a maintenance screen for maintaining the at least one maintenance point.

Furthermore, for example, the display unit 1-2 may display a user interface (UI) or graphic user interface (GUI) associated with a function provided by the remote maintenance server 1.

Furthermore, the display unit 1-2 may display a processing result by the 104 on the screen.

According to an embodiment, the display unit 1-2 may display control information which is information associated with at least one of a control status and a control result in which at least one of the control setting value, the operation rate, the set temperature and the compression capacity is controlled in a first region on the maintenance screen.

The display unit 1-2 may display a control setting UI which is a graphic user interface (GUI) for receiving the control setting value in a second region on the maintenance screen.

According to an embodiment, the controller 1-4 may control at least one of the operation rate, the set temperature and the compression capacity in a predetermined time interval.

In this case, the control information may further include information on the specific time period.

Furthermore, in this case, the display unit 1-4 may receive the specific time period through the control setting UI.

The display unit 1-2 may include at least one of a liquid crystal display, a thin film transistor-liquid crystal display, an organic light-emitting Diode, a flexible display, and a three-dimensional (3D) display.

Furthermore, there may exist two or more display units 1-2 according to an implementation form of the remote maintenance server 1. For example, an external display unit (not shown) and an internal display unit (not shown) are concurrently provided therein.

When the display unit 1-2 and a sensor for sensing a touch operation (hereinafter, referred to as a "touch sensor") have an interlayer structure (hereinafter, referred to as a "touch screen"), the display unit 1-2 may be used as an input device rather than an output device. The touch sensor may have a form with a touch film, a touch sheet, a touch pad, and the like.

The controller 1-4 may perform the role of controlling constituent elements included in the remote maintenance server 1 to provide a remote maintenance function according to an embodiment disclosed in the present disclosure.

According to an embodiment, the controller 1-4 may control at least one of an operation rate for the plurality of indoor units, a set temperature, and a compression capacity of a compressor contained in the air conditioner according to a control setting value.

Here, the operation rate may be a ratio between an overall number of all of the plurality of indoor units and a number of operated indoor units among the overall number of plurality of indoor units.

For example, when the overall number of all of the plurality of indoor units is 100, and the number of indoor units being operated is 50, the operation rate may be 0.5.

Furthermore, the controller 1-4 may adjust an operation frequency for the compressor to control the compression capacity.

Figure 7:
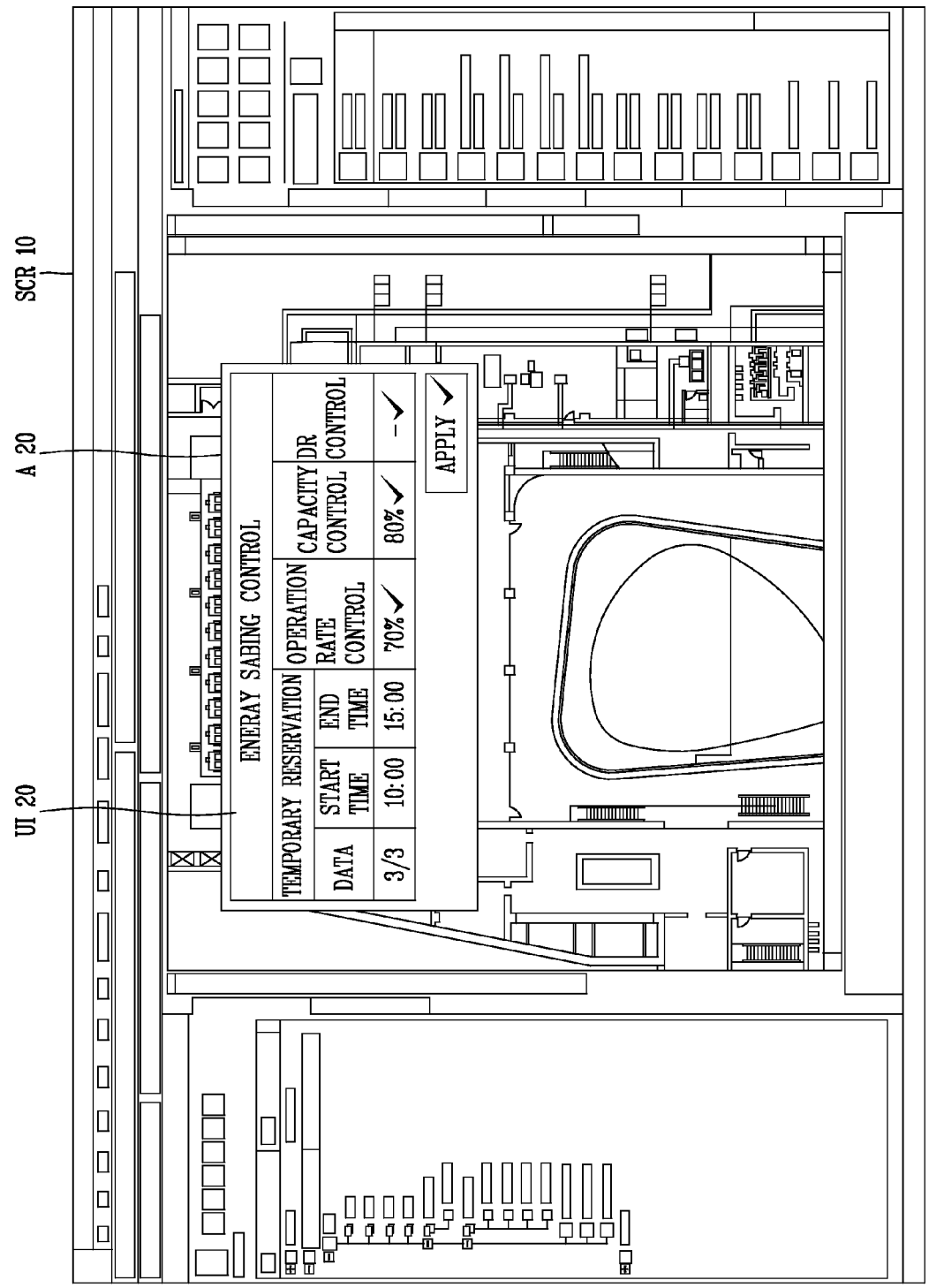
FIGS. 7 and 8 are exemplary views illustrating a maintenance screen of a remote maintenance server according to an embodiment disclosed in the present disclosure.
Figure 8:
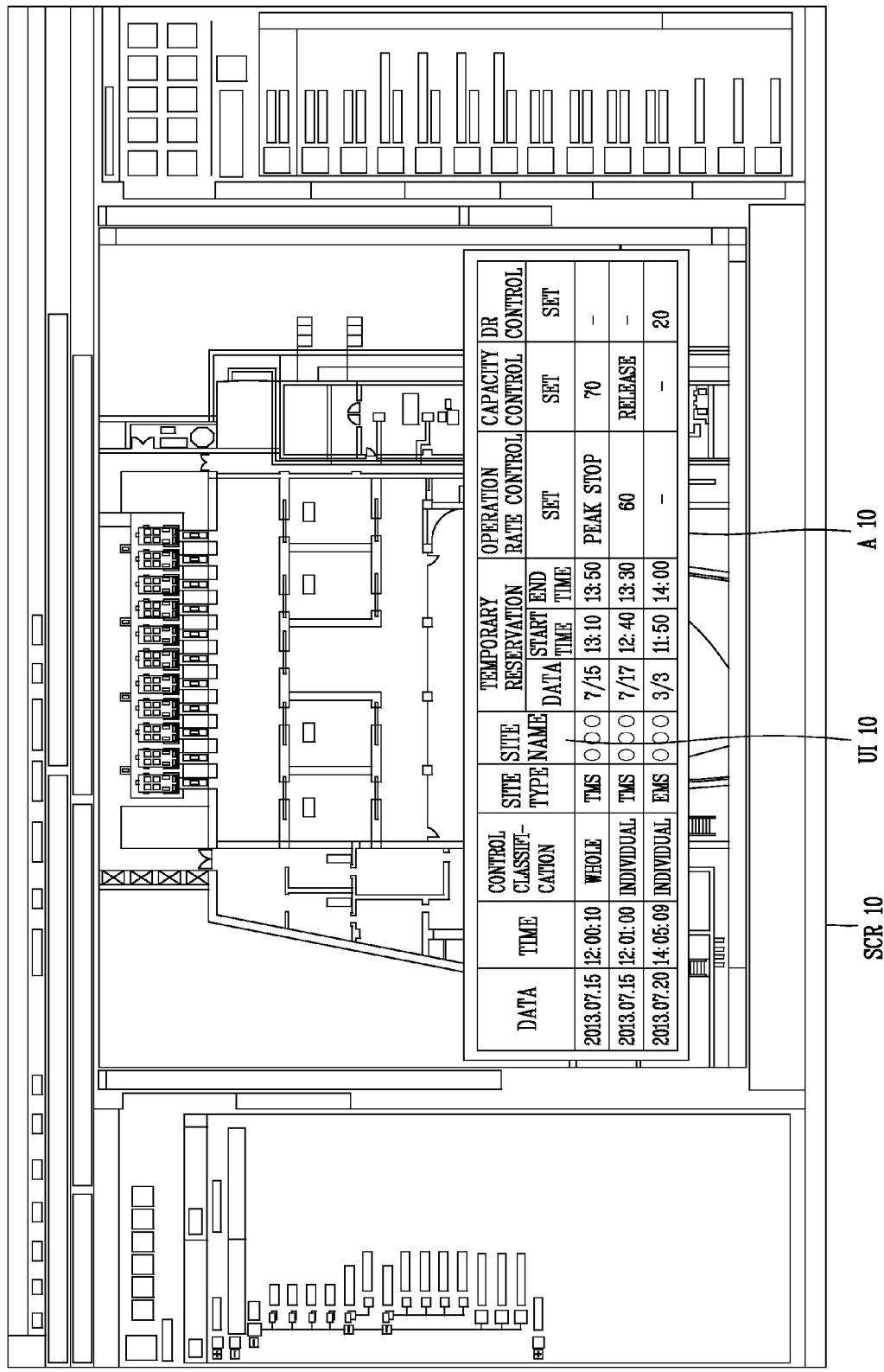

FIGS. 7 and 8 are exemplary views illustrating a maintenance screen of a remote maintenance server according to an embodiment disclosed in the present disclosure.

Referring to FIGS. 7 and 8, the display unit 1-2 may display a maintenance screen (SCR10) for maintaining the at least one maintenance point.

According to an embodiment, the controller 1-4 may control the display unit 1-2 to display control information which is information associated with at least one of a control status and a control result in which at least one of the control setting value, the operation rate, the set temperature and the compression capacity is controlled in a first region (A10) on the maintenance screen (SCR10) (refer to FIG. 8)

Furthermore, according to an embodiment, the controller 1-4 may control the display unit 1-2 to display a control setting UI (UI20) which is a graphic user interface (GUI) for receiving the control setting value in a second region (A20) on the maintenance screen (SCR10) (refer to FIG. 7).

Figure 10:
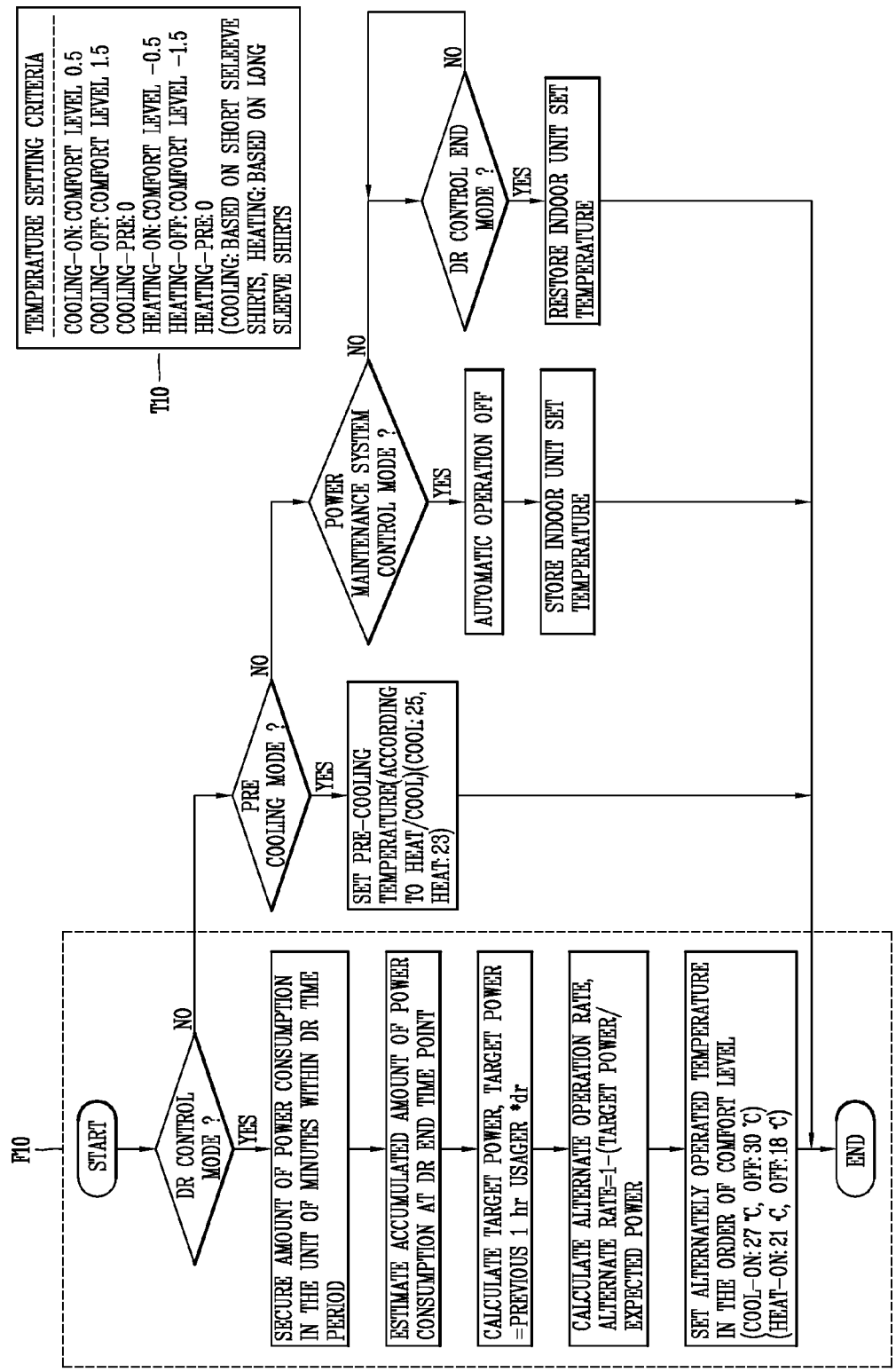
FIG. 10 is a flow chart illustrating a DR control mode disclosed in the present disclosure.

As illustrated in FIG. 7, the control setting value may be a setting value associated with an operation rate of the plurality of indoor units (70%), a compression capacity for the compressor (80%), and a DR control rate (refer to FIG. 10 and the description thereof).

The user or administrator of the remote maintenance server 1 may enter the control setting value through the control setting UI (UI20).

Furthermore, the user or administrator of the remote maintenance server 1 may perform an energy reduction function by selecting (clicking or touching) icon "apply" provided by the control setting UI (UI20).

Furthermore, the user or administrator of the remote maintenance server 1 may reserve an execution time of the energy saving function through the control setting UI (UI20) (for example, date (3/3), start time (10:00), end time (15:00)).

Furthermore, as illustrated in FIG. 8, the controller 1-4 may display a monitoring UI (UI10) for monitoring the control information in the first region (A10).

Accordingly, the user or administrator of the remote maintenance server 1 may check whether or not the operation rate is controlled, whether or not the set temperature is controlled, whether or not the compression capacity is controller and whether or not the DR is controlled through the monitoring UI (UI10) (for example, "setting" located below "operation rate control" in FIG. 8), and check control setting values (for example, an operation rate of 60 on Jul. 15, 2013 in FIG. 8) corresponding to the operation rate, the set temperature, the compression capacity and the DR control rate.

Furthermore, the user or administrator of the remote maintenance server 1 may check control information which is information associated with at least one of a control status (for example, "peak stop" or the like in FIG. 8) and a control result in which at least one maintenance point is controlled by at least one of the control setting value, the operation rate, the set temperature, the compression capacity and the DR control rate through the monitoring UI (UI10).

Figure 9A:
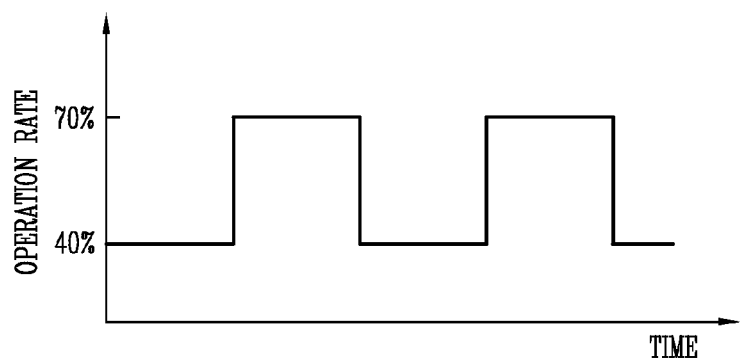
FIGS. 9A, 9B and 9C are exemplary views illustrating an energy saving function according to an embodiment disclosed in the present disclosure.
Figure 9B:
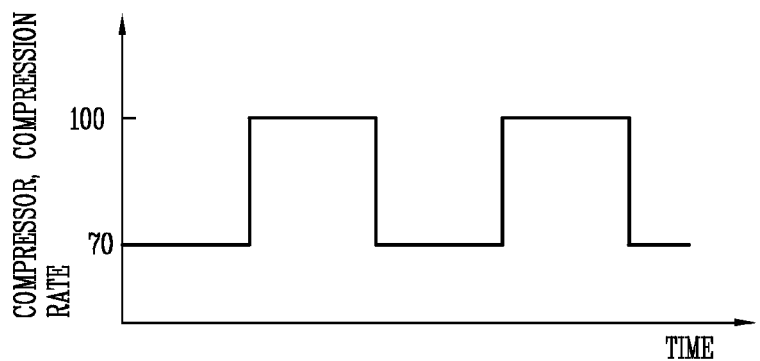
Figure 9C:
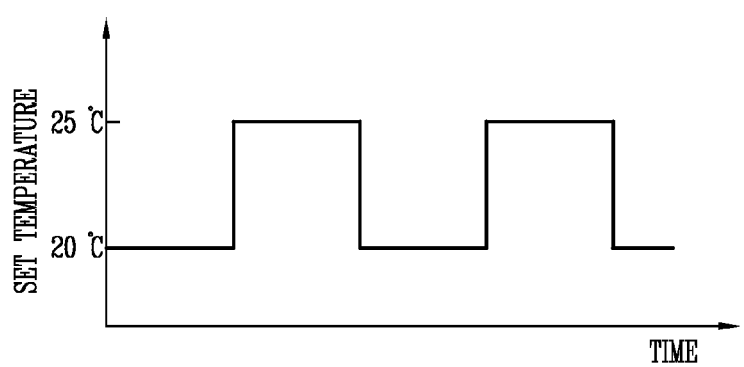

FIGS. 9A through 9C are exemplary views illustrating an energy saving function according to an embodiment disclosed in the present disclosure.

Referring to FIGS. 9A through 9C, the controller 1-4 may control at least one of the operation rate, the set temperature and the compression capacity for a specific time period.

The controller 1-4 may change at least one of the operation rate (40-70%, FIG. 9A), the set temperature (20-25° C., FIG. 9C) and the compression capacity (70-100%, FIG. 9B) in a predetermined time interval or in a periodical manner.

In this case, the control information may further include information on the specific time period.

Furthermore, the display unit 1-2 may receive the specific time period through the control setting UI (UI20).

According to an embodiment, the controller 1-4 may control the communication unit 1-3 to generate a control command for controlling at least one of the operation rate, the set temperature and the compression capacity, and transmit the generated control command to the at least one maintenance point.

In this case, the at least one maintenance point may control at least one of the operation rate, the set temperature and the compression capacity based on the control command.

Furthermore, according to an embodiment, as stated in claim 11, the communication unit 1-3 may acquire consumption power information consumed by the air conditioner.

In this case, the controller 1-4 may generate the control command based on the acquired consumption power information.

In other words, the communication unit 1-3 may acquire power consumption information from the at least one maintenance point, respectively. In this case, the controller 1-4 may determine whether a reduction in the amount of power consumption is required based on the collected power consumption information.

The controller 1-4 may generate the control command when a reduction in the amount of power consumption is required.

To this end, the at least one maintenance point may include a power meter (not shown) for collecting the consumption power information from the air conditioner.

According to an embodiment, the controller 1-4 may compare the consumption power information with target power information, and generate the control command based on the comparison result.

Specifically, the controller 1-4 may determine at least one of the operation rate, the set temperature and the compression capacity such that an amount of consumption power consumed by the maintenance point is less than a target amount of consumption power.

Furthermore, according to an embodiment, the controller 1-4 may determine at least one of the operation rate, the set temperature and the compression capacity based on an experimentally determined comfort level for the air conditioner.

The comfort level may be calculated based on workers who work at the at least one maintenance point.

A relative comfort level in a different control condition may be experimentally determined on the assumption that a comfort level in a specific control condition (for example, the operation rate is 100%) is 1.

In addition, it should be clearly understood by those skilled in the art that various comfort level determination methods can be applicable to a remote maintenance function according to an embodiment disclosed in the present disclosure.

Accordingly, the controller 1-4 may determine at least one of the operation rate, the set temperature and the compression capacity to have the comfort level above a specific value while an amount of consumption power consumed by the maintenance point is less than a target amount of consumption power.

According to an embodiment, the communication unit 1-3 may receive a demand response (DR) control request for the at least one maintenance point from a power maintenance system.

The power maintenance system may be a system operated by a company such as Korea Electric Power Corporation.

The controller 1-4 may generate the control command when the DR control request is received.

According to an embodiment, the power maintenance system may collect power consumption information from the at least one maintenance point, respectively, and generate the DR control request based on the collected power consumption information.

According to an embodiment, the controller 1-4 may activate a DR control mode when the DR control request is received.

When the DR control mode is activated, the controller 1-4 may generate the control command to adjust the set temperature based on a DR control rate.

According to an embodiment, the DR control mode may be activated during a DR time period.

In this case, the controller 1-4 may calculate a predicted amount of power consumption corresponding to the at least one maintenance point during the DR time period.

Furthermore, the controller 1-4 may multiply an amount of power consumption consumed by the at least one maintenance point from a time point at which the DR control mode is activated to a specific previous time point with the DR control rate to calculate an amount of DR power.

Furthermore, the controller 1-4 may calculate an alternate operation rate based on the predicted amount of power consumption and the amount of DR power, and set the set temperature to a different temperature in a periodically alternating manner during the DR time period based on the alternate operation rate.

Here, the alternate operation rate may be 1−(the amount of DR power/the predicted amount of power consumption).

Furthermore, according to an embodiment, the specific time period may be 1 hour.

FIG. 10 is a flow chart illustrating a DR control mode disclosed in the present disclosure.

Referring to FIG. 10, a specific DR control flow chart (F10) for the foregoing DR control mode will be checked.

Describing the DR control flow chart (F10) in detail, first, the controller 1-4 may acquire (secure) an amount of power consumption for the at least one maintenance point in the unit of minutes within the DR time period when the DR control mode is activated.

The controller 1-4 may accumulate an amount of power consumption in the unit of minutes to expect (or estimate) an accumulated amount of power consumption (or expected amount of power consumption) at an end touch input (or after the DR time period has passed).

Next, the controller 1-4 may multiply an amount of power consumption for one hour prior to the DR time period with the DR control rate (for example, 20%) to calculate a target amount of power consumption.

Next, the controller 1-4 may calculate an alternate operation rate based on the predicted amount of power consumption and the amount of DR power.

The alternate operation rate may be 1−(target power (the target amount of power consumption/the predicted amount of power consumption).

The controller 1-4 may determine a set temperature that should be alternately operated in consideration of an experimentally determined comfort level.

For example, as illustrated in FIG. 10, the controller 1-4 may determine that the set temperature of cooling on (COOL-ON) to be 27 degrees, and the set temperature of cooling off (COOL-OFF) to be 30 degrees.

In this case, the controller 1-4 may alternately set the set temperature of indoor units to 27 and 30 degrees based on the alternate rate during the DR time period.

For example, when the alternate rate is 0.5, there may exist 50% for a time period of the set temperature of 27 degrees and the set temperature of 30 degrees, respectively.

As a result, in the DR control mode, the remote maintenance server 1 may control the operation of the plurality of indoor units to reduce power as much as a DR control rate based on an accumulated amount of power consumption for one hour prior to the DR time period.

According to an embodiment, a method of determining the set temperature may be determined based on a comfort level.

For example, as shown in the temperature setting reference table (T10) in FIG. 10, the set temperature may be determined in consideration of a predetermined comfort level according to the cooling, heating, on and off.

According to an embodiment, the DR control mode may further include a pre-cooling mode, a power maintenance system control mode and a DR control end mode.

The pre-cooling mode may be a mode in which cooling is carried out in advance to prevent the comfort level or the like from being reduced when the DR control mode is activated.

For example, as illustrated in FIG. 10, when the pre-cooling mode is carried out, the plurality of indoor units may be controlled at a pre-cooling temperature (cooling: 25 degrees, heating: 23 degrees).

The power maintenance system control mode may be mode in which a power maintenance system operated by a power maintenance company directly controls the at least one maintenance point to maintain energy.

In this case, the remote maintenance server 1 may turn off an automatic operation function allowing the remote maintenance server 1 to automatically maintain the maintenance point, and store the existing set temperature of indoor units.

Furthermore, the remote maintenance server 1 may store the existing set temperature of indoor units even when different DR control modes are activated.

Finally, in the DR control end mode, the set temperature of the plurality of indoor units may be restored to the stored existing set temperature of indoor units.

Referring to FIG. 5 again, the input unit 1-1 may perform the role of receiving a user input for controlling the remote maintenance server 1.

The input unit 1-1 may generate input data for allowing the user to control the operation of the remote maintenance server 1.

The input unit 1-1 may be configured with a keypad, a dome switch, a touch pad (pressure/capacitance), a jog wheel, a jog switch, and the like. In particular, when the touch pad and the display unit 1-2 have an interlayer structure, it may be referred to as a touch screen.

According to an embodiment, the input unit 1-1 may receive (or input) the foregoing various user inputs from the user.

For example, the input unit 1-1 may receive a control input associated with facility control on a control screen displayed by the display unit 1-2.

The storage unit 1-5 may perform the role of storing information received, processed and generated by the remote maintenance server 1.

For example, the storage unit 1-5 may store a program for the processing and control of the controller 1-4, and perform a function of temporarily storing input/output data (for example, a user input through a user interface, a control processing procedure, a control result, etc.).

Specifically, the storage unit 1-5 may store information on the foregoing classification criteria, information on a plurality of classified control groups and control regions contained therein, and the like.

Furthermore, the storage unit 1-5 may store the user interface screen (or the control screen).

The storage unit 1-5 may include at least one type of storage medium among a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like.

Furthermore, the remote maintenance server 1 may operate a web storage which performs the storage function of the storage unit 1-5 on the Internet.

Description of Remote Maintenance Method According to an Embodiment Disclosed in the Present Disclosure As a remote maintenance method by a remote maintenance server for remotely maintaining at least one maintenance point provided with an air conditioner having a plurality of indoor units performing air conditioning and at least one outdoor unit connected to the indoor units to drive the indoor units, a remote maintenance method according to an embodiment disclosed in the present disclosure may include displaying a maintenance screen for maintaining the at least one maintenance point, controlling at least one of at least one of an operation rate for the plurality of indoor units, a set temperature, and a compression capacity of a compressor contained in the air conditioner according to a control setting value, and displaying control information which is information associated with at least one of a control status and a control result in which at least one of the control setting value, the operation rate, the set temperature and the compression capacity in a first region on the maintenance screen.

Figure 11:
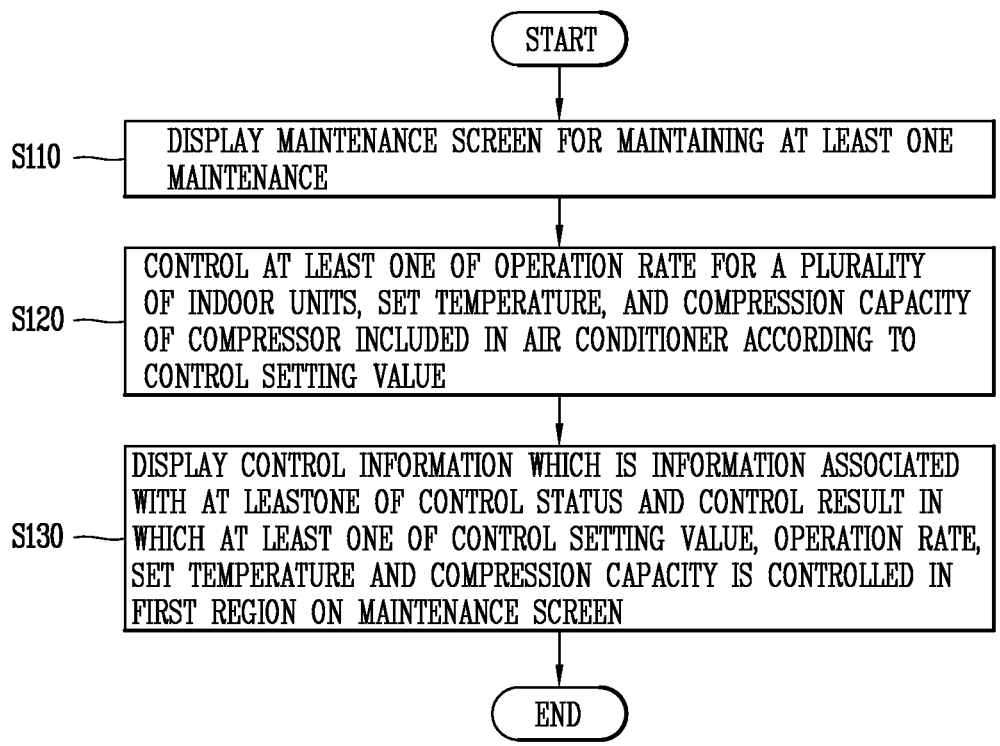
FIG. 11 is a flow chart illustrating a remote maintenance method according to an embodiment disclosed in the present disclosure.

FIG. 11 is a flow chart illustrating a remote maintenance method according to an embodiment disclosed in the present disclosure.

Referring to FIG. 11, a remote maintenance method according to an embodiment disclosed in the present disclosure may be carried out in the following steps.

First, a maintenance screen for maintaining at least one maintenance point may be displayed (S110).

Next, at least one of an operation rate for the plurality of indoor units, a set temperature, and a compression capacity of a compressor contained in the air conditioner may be controlled according to a control setting value (S120).

Next, control information which is information associated with at least one of a control status and a control result in which at least one of the control setting value, the operation rate, the set temperature and the compression capacity is controlled may be displayed in a first region on the maintenance screen (S130).

Remote Maintenance Function Through Terminal Connected to Remote Maintenance Server Hereinafter, a remote maintenance function through an external terminal connected to a remote maintenance server according to an embodiment will be described in detail with reference to FIGS. 12 and 13.

A remote maintenance function according to an embodiment disclosed herein may be implemented in part or a combination of the components or steps included in the foregoing embodiments or may be implemented in a combination of the foregoing embodiments, and hereinafter, overlapping portions may be omitted for clarity of the embodiment of a remote maintenance function through a terminal according to an embodiment.

Figure 12:
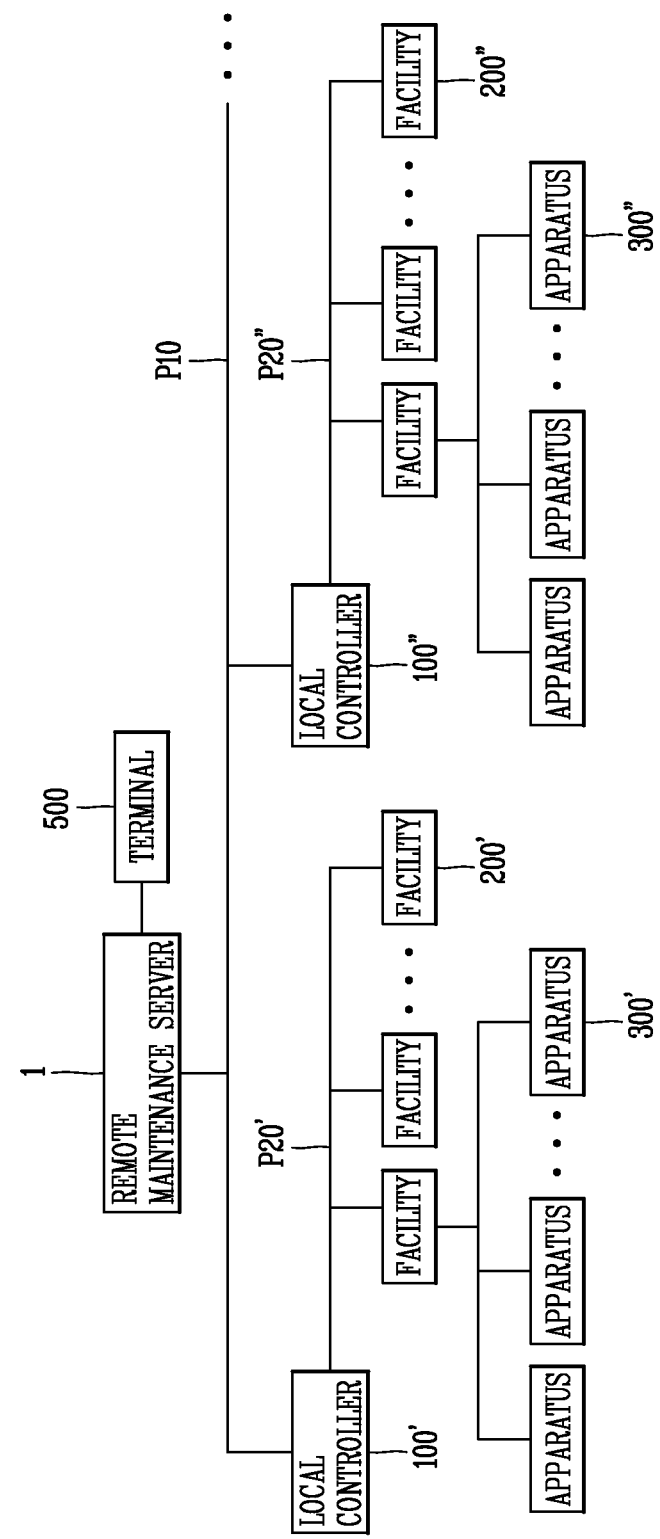
FIG. 12 is an exemplary view illustrating an external terminal connected to a remote maintenance server according to an embodiment disclosed in the present disclosure.

FIG. 12 is an exemplary view illustrating an external terminal connected to a remote maintenance server according to an embodiment disclosed in the present disclosure.

Referring to FIG. 12, the remote maintenance server 1 according to an embodiment disclosed in the present disclosure may be connected to a terminal (or external terminal 500) in a wired or wireless manner.

For the purpose of this, the remote maintenance server 1 may be connected to the terminal 500 through the foregoing communication unit 1-3.

The user or administrator of a remote total maintenance system (TMS) may control the remote maintenance server 1 through the terminal 500.

Accordingly, the user or administrator of the remote total maintenance system (TMS) may execute all remote maintenance functions according to the foregoing embodiments through the terminal 500.

Figure 13:
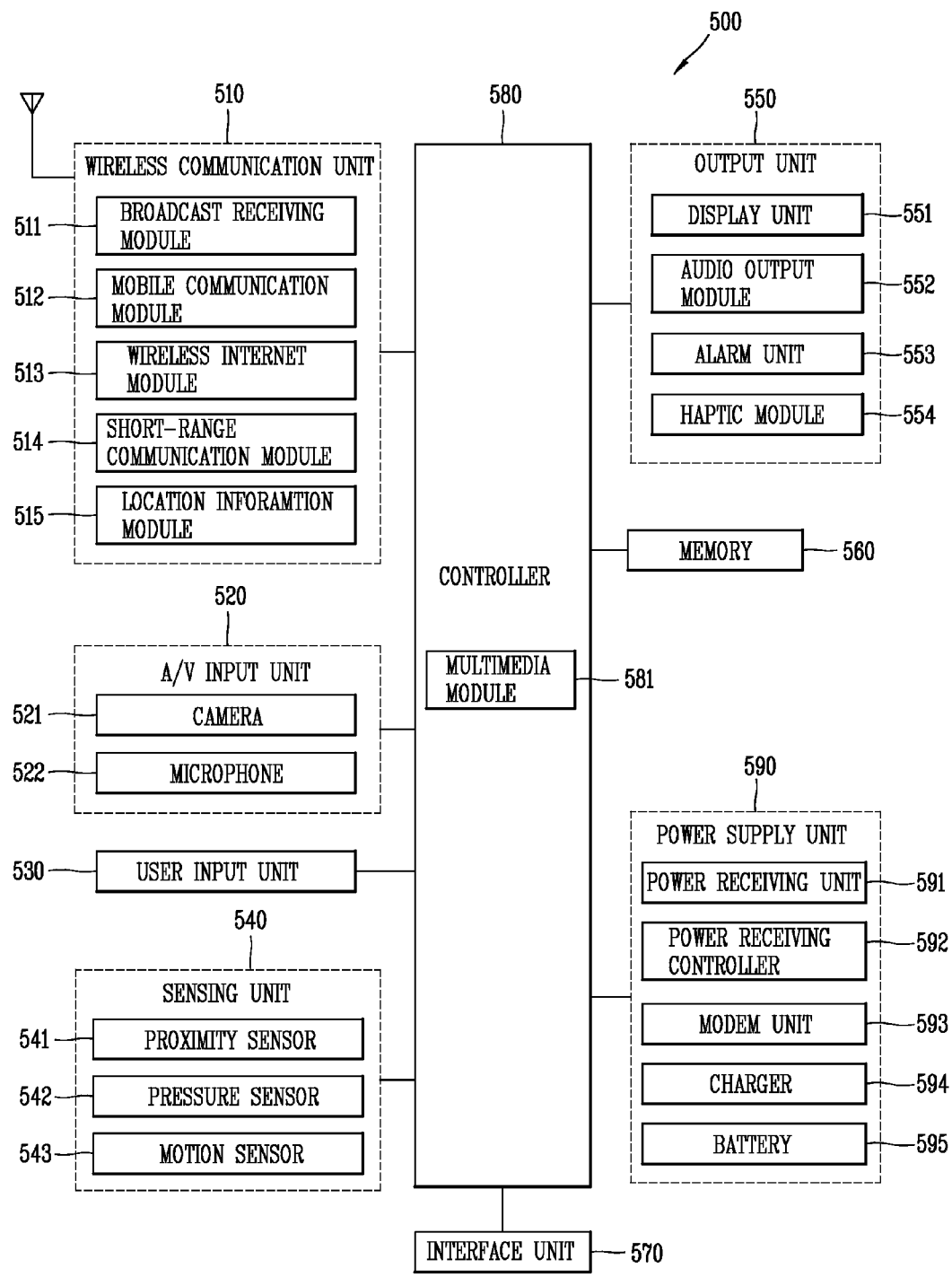
FIG. 13 illustrates a configuration in which a terminal is implemented in a mobile terminal form according to the embodiments disclosed in the present disclosure.

FIG. 13 illustrates a configuration diagram illustrating the configuration of a terminal connected to a remote maintenance server disclosed in the present disclosure.

FIG. 13 illustrates a configuration in which the terminal 500 is implemented in a mobile terminal form according to the embodiments disclosed in the present disclosure.

Furthermore, the terminal 500 may include a wireless communication unit 110, an audio/video (A/V) input unit 520, a user input unit 530, a sensing unit 540, an output unit 550, a memory 560, an interface unit 570, a controller 580, a power supply unit 590, and the like. However, the constituent elements as illustrated in FIG. 9 are not necessarily required, and the mobile device may be implemented with greater or less number of elements than those illustrated elements.

Hereinafter, the constituent elements will be described in sequence.

The wireless communication unit 510 may typically include one or more elements allowing radio communication between the terminal 500 and a wireless communication system, between radio communication the terminal 500 and a network in which the terminal 500 is located, or between the terminal 500 and the central control device 100.

For example, the wireless communication unit 510 may include a broadcast receiving module 511, a mobile communication module 512, a wireless Internet module 513, a short-range communication module 514, a location information module 515, and the like.

The broadcast receiving module 511 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the terminal 500. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 512.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 511 may receive a broadcast signal using various types of broadcast systems. In particular, the broadcast receiving module 511 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 511 is, of course, configured to be suitable for every broadcast system that provides a broadcast signal as well as the above-mentioned digital broadcast systems.

The broadcast signal and/or broadcast-associated information received through the broadcast receiving module 511 may be stored in the memory 560.

The mobile communication module 512 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 513 means a module for supporting wireless Internet access. The wireless Internet module 513 may be built-in or externally installed to the terminal 500. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 514 is a module for supporting a short-range communication. Here, it may be used a wireless short-range communication technology including Bluetooth®, Radio Frequency IDentification (RFID), Infrared Data Association (IrDA), Ultra WideBand (UWB), ZigBee®, and the like. Meanwhile, it may be used a wired short-range communication technology including Universal Serial Bus (USB), IEEE 1394, Thunderbolt™, and the like.

The wireless Internet module 513 or the short-range communication module 514 may establish data communication connection to the central control device 100.

Through the established data communication, when there is an audio signal to be output while transmitting power in a wireless manner, the wireless Internet module 513 or the short-range communication module 514 may transmit the audio signal to the central control device 100 through the short-range communication module. Furthermore, through the established data communication, when there is information to be displayed, the wireless Internet module 513 or the short-range communication module 514 may transmit the information to the central control device 100. Otherwise, through the established data communication, the wireless Internet module 513 or the short-range communication module 514 may receive an audio signal entered through a microphone embedded in the central control device 100. Furthermore, the wireless Internet module 513 or the short-range communication module 514 may transmit the identification information (for instance, phone number or device name in case of a portable phone) of the mobile terminal 500 to the central control device 100 through the established data communication.

The location information module 515 is a module for acquiring a location of the mobile device, and there is a global positioning system (GPS) module as an example.

Referring to FIG. 9, the A/V (audio/video) input unit 520 receives an audio or video signal, and the A/V (audio/video) input unit 520 may include a camera 521 and a microphone 522. The camera 521 processes a image frame, such as still picture or video, obtained by an image sensor in a video phone call or image capturing mode. The processed image frame may be displayed on a display unit 551.

The image frames processed by the camera 521 may be stored in the memory 560 or transmitted to an external device through the wireless communication unit 510. Two or more cameras 521 may be provided according to the use environment of the mobile device.

The microphone 522 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 512 in the phone call mode. The microphone 522 may implement various types of noise canceling algorithms to cancel noise generated in a procedure of receiving the external audio signal.

The user input unit 530 may generate input data to control an operation of the terminal. The user input unit 530 may be configured by including a keypad, a dome switch, a touch pad (pressure/capacitance), a jog wheel, a jog switch, and the like.

The sensing unit 540 may include a proximity sensor 541, a pressure sensor 542, a motion sensor 543, and the like. The proximity sensor 541 detects an object approaching the mobile terminal 500, or the presence or absence of an object existing adjacent to the mobile terminal 500, and the like without any mechanical contact. The proximity sensor 541 may detect a proximity object using a change of the AC magnetic field or static magnetic field, a change rate of the electrostatic capacity, or the like. Two or more proximity sensors 541 may be provided according to the aspect of configuration.

The pressure sensor 542 may detect whether or not a pressure is applied to the mobile terminal 500, a size of the pressure, and the like. The pressure sensor 542 may be provided at a portion where the detection of a pressure is required in the mobile terminal 500 according to the use environment. When the pressure sensor 542 is provided in the display unit 551, it may be possible to identify a touch input through the display unit 551 and a pressure touch input by which a pressure larger than the touch input is applied according to a signal outputted from the pressure sensor 542. Furthermore, it may be possible to know a size of the pressure applied to the display unit 551 during the input of a pressure touch.

The motion sensor 543 detects the location or movement of the mobile terminal 500 using an acceleration sensor, a gyro sensor, and the like. The acceleration sensor that can be used in the motion sensor 543 is an element for converting an acceleration change in any one direction into an electrical signal. The acceleration sensor is typically configured by providing two or three axes in a package, and according to the used circumstances there may be a case where only one z-axis is required. Accordingly, when the x-axis or y-axis acceleration sensor is used instead of the z-axis acceleration sensor due to any reason, the acceleration sensor may be provided to be placed upright on a main substrate using a separate piece of substrate. The gyro sensor as a sensor for measuring an angular velocity of the mobile terminal 500 performing a rotational movement may sense a rotated angle with respect to each reference direction. For instance, the gyro sensor may sense each rotated angle with reference to three directional axes, namely, azimuth, pitch and roll.

The output unit 550 is configured to generate an output for visual, auditory or tactile sense, and the output unit 550 may include the display unit 551, an audio output module 552, an alarm unit 553, a haptic module 554, and the like.

The display unit 551 may display (output) information processed in the terminal 500. For example, when the terminal 500 is in a phone call mode, the display unit 551 may display a User Interface (UI) or a Graphic User Interface (GUI) associated with a call. When the terminal 500 is in a video call mode or image capturing mode, the display unit 551 may display a captured image and/or received image, a UI or GUI.

The display unit 551 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile device body through a region occupied by the display unit 551 of the mobile device body.

Two or more display units 551 may be implemented according to a configured aspect of the terminal 500. For instance, a plurality of the display units 551 may be arranged on one surface to be spaced apart from or integrated with each other, or may be arranged on different surfaces.

When the display unit 551 and a touch sensitive sensor (hereinafter, referred to as a "touch sensor") have an interlayer structure (hereinafter, referred to as a "touch screen"), the display unit 551 may be used as an input device rather than an output device. The touch sensor may be implemented as a touch film, a touch sheet, a touch pad, and the like.

The touch sensor may be configured to convert changes of a pressure applied to a specific part of the display unit 551, or a capacitance occurring from a specific part of the display unit 551, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 580. Accordingly, the controller 580 may sense which region of the display unit 551 has been touched.

A proximity sensor 541 may be arranged at an inner region of the terminal 500 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 552 may output audio data received from the wireless communication unit 510 or stored in the memory 560, in a call-receiving mode, a call-placing mode, a recording mode, a voice recognition mode, a broadcast reception mode, and so on. The audio output module 552 may output audio signals relating to functions performed in the terminal 500, e.g., sound alarming a call received or a message received, and so on. The audio output module 552 may include a receiver, a speaker, a buzzer, and so on.

The alarm 553 outputs signals notifying occurrence of events from the terminal 500. The events occurring from the terminal 500 may include call received, message received, key signal input, touch input, and so on. The alarm 553 may output not only video or audio signals, but also other types of signals such as signals notifying occurrence of events in a vibration manner. Since the video or audio signals can be output through the display unit 551 or the audio output unit 552, the display unit 551 and the audio output module 552 may be categorized into a part of the alarm 553.

The haptic module 554 generates various tactile effects which a user can feel. A representative example of the tactile effects generated by the haptic module 554 includes vibration. Vibration generated by the haptic module 554 may have a controllable intensity, a controllable pattern, and so on. For instance, different vibration may be output in a synthesized manner or in a sequential manner.

The haptic module 554 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 554 may be configured to transmit tactile effects through a user's direct contact, or a user's muscular sense using a finger or a hand. The haptic module 554 may be implemented in two or more in number according to the configuration of the terminal 500.

The memory 560 may store a program for processing and controlling the controller 580. Alternatively, the memory 560 may temporarily store input/output data (e.g., phonebook data, messages, audios, still images, videos, and the like). Also, the memory 560 may store data related to various patterns of vibrations and sounds outputted upon the touch input on the touch screen.

In some embodiments, software components including an operating system (not shown), a module performing a function of the wireless communication unit 510, a module operated along with the user input unit 530, a module operated along with the A/V input unit 520, and a module operated along with the output unit 550. The operating system (for example, LINUX, UNIX, OS X, WINDOWS, Chrome, Symbian, iOS, Android, VxWorks, or other embedded systems) may include various software components and/or drivers for controlling system tasks such as memory management, power management, and the like.

Furthermore, the memory 560 may store a program (for example, control program) associated with the control or maintenance of a facility. The program may be carried out by the controller 580.

Furthermore, the memory 560 may store an application associated with the control or maintenance of a facility downloaded from an application providing server (for example, app store).

The memory 560 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the terminal 500 may operate a web storage which performs the storage function of the memory 560 on the Internet.

The interface unit 570 may generally be implemented to interface the mobile device with external devices. The interface unit 570 may allow a data reception from an external device, a power delivery to each component in the terminal 500, or a data transmission from the terminal 500 to an external device. The interface unit 570 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the terminal 500, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the terminal 500 via a port.

The interface unit may serve as a path for power to be supplied from an external cradle to the terminal 500 when the terminal 500 is connected to the external cradle or as a path for transferring various command signals inputted from the cradle by a user to the terminal 500. Such various command signals or power inputted from the cradle may operate as signals for recognizing that the mobile device has accurately been mounted to the cradle.

The controller 580 typically controls the overall operations of the terminal 500. For example, the controller 580 performs the control and processing associated with telephony calls, data communications, video calls, and the like. Furthermore, the controller 580 may include a multimedia module 581 which provides multimedia playback. The multimedia module 581 may be configured as part of the controller 580 or as a separate component.

The controller 580 can perform a pattern recognition processing so as to recognize writing or drawing input on the touch screen as text or image.

The power supply unit 590 receives external power and internal power under the control of the controller 580 to supply power required by various components.

The power supply unit 590 may be provided with a battery 599 configured to supply power to various elements of the terminal 500, and may include a charger 598 for charging the battery 599 in a wired or wireless manner.

Though the present disclosure discloses a mobile terminal connected to the central control device 100 as an example, it may be easily understood by those skilled in the art that the configuration according to the exemplary embodiments of this specification can also be applied to a stationary terminal such as a digital TV, a desktop computer and the like, excluding a case of being applicable only to the mobile terminal.

Briefly summarizing the foregoing technologies disclosed in the present disclosure, the technologies disclosed in the present disclosure relates to a remote maintenance server, a remote total maintenance system including the same, and a remote maintenance method thereof capable of implementing executing operation rate control, compression capacity control or set temperature control using a link between a local controller installed at a control site (or maintenance point) and a remote total maintenance server for the purpose of energy saving.

In particular, DR control may be instructed to the remote maintenance server (TMS server) according to the power supply and demand status of a power company such as Korea Electric Power Corporation that operates a power maintenance system, and the TMS server may transfer a suitable command to a local controller linked therewith, thereby performing an energy saving function.

To this end, a power meter may be installed at each control site, and the relevant power may be transferred to the TMS server.

According to a remote maintenance server, a remote maintenance system including the remote maintenance server and a remote maintenance method according to an embodiment disclosed in the present disclosure, at least one of an operation rate for the plurality of indoor units, a set temperature, and a compression capacity of a compressor contained in the air conditioner may be controlled, thereby obtaining an advantage in which power consumed by a control site can be efficiently reduced.

Furthermore, according to a remote maintenance server, a remote maintenance system including the remote maintenance server and a remote maintenance method according to an embodiment disclosed in the present disclosure, control information which is information associated with at least one of a control status and a control result in which at least one of the control setting value, the operation rate, the set temperature and the compression capacity may be displayed on a maintenance screen of the remote maintenance server or a control setting UI which is a graphic user interface (GUI) for receiving the control setting value may be displayed on the maintenance screen, thereby obtaining an advantage in which a user can perform an energy saving function in an intuitive and efficient manner and check the execution status and result of the energy saving function.

The scope of the present invention may not be limited to those specific embodiments, and various modifications, variations, and improvements can be made without departing from the concept of the invention, and within the scope of the appended claims.

What is claimed is:

1. A remote maintenance server for remotely maintaining at least one maintenance point provided with an air conditioner having a plurality of indoor units performing air conditioning and at least one outdoor unit connected to the indoor units to drive the indoor units, the remote maintenance server comprising:
   a display unit configured to display a maintenance screen for maintaining the at least one maintenance point; and
   a remote controller configured to control at least one of an operation rate for the plurality of indoor units, a set temperature for the maintenance point, and a compression capacity for a compressor contained in the outdoor unit with a control command, and control the display unit to display control information, which is information associated with at least one of a control status and a control result for a control setting value, for one of the operation rate, the temperature and the compression capacity in a first region on the maintenance screen,
   wherein the remote maintenance server further comprising:
   a communication unit, wherein the communication unit receives a demand response control (DR) request for the at least one maintenance point from a power maintenance system over a wired or wireless network,
   wherein the remote controller activates a DR control mode when the DR control request is received, and generates the control command to adjust the set temperature for at least one maintenance point based on a DR control rate when the DR control mode is activated,
   wherein the DR control mode is activated during a DR time period, and
   wherein the remote controller calculates a predicted amount of power consumption corresponding to the at least one maintenance point during the DR time period, and multiplies an amount of power consumption consumed by the at least one maintenance point from a time point at which the DR control mode is activated to a specific previous time point with the DR control rate to calculate an amount of DR power, and calculates an alternate operation rate based on the predicted amount of power consumption and the amount of DR power.

2. The remote maintenance server of claim 1, further comprising:
   a graphic user interface (GUI) for receiving an input in a second region on the maintenance screen, and
   wherein the second region displays a control setting user interface controlled by the remote controller.

3. The remote maintenance server of claim 1, wherein the remote controller controls a control setting value of the control command for the at least one of the operation rate, the set temperature and the compression capacity for a time period specified by a user.

4. The remote maintenance server of claim 3, wherein the remote controller changes the control setting value for the at least one of the operation rate, the set temperature and the compression capacity in a predetermined time interval or in a periodical manner.

5. The remote maintenance server of claim 1, wherein the operation rate is a ratio between an overall number of all of the plurality of indoor units and a number of operated indoor units among the overall number of indoor units.

6. The remote maintenance server of claim 1, wherein the remote controller generates a control command for setting at least one of the operation rate, the temperature and the compression capacity, and controls the communication unit to transmit the generated control command to the local controller, wherein the local controller executes the control command that sets at least one of the operation rate, the temperature and the compression capacity.

7. The remote maintenance server of claim 6, wherein the local controller adjusts an operation frequency of the compressor to control the compression capacity.

8. The remote maintenance server of claim 6, further comprising a power meter collecting power consumption information from the air conditioner at the least one maintenance point, wherein the communication unit receives the power consumption information for power consumed by the air conditioner and provides the power consumption information to the remote controller.

9. The remote maintenance server of claim 8, wherein the remote controller generates the control command based on the acquired power consumption information.

10. The remote maintenance server of claim 9, wherein the remote controller makes a comparison between the power consumption information and a target amount of power consumption, and generates the control command based on the comparison.

11. The remote maintenance server of claim 9, wherein the remote controller determines a control setting value for the at least one of the operation rate, the set temperature and the compression capacity such that power consumption by the maintenance point is less than a target amount of power consumption.

12. The remote maintenance server of claim 11, wherein the remote controller determines a control setting value for the at least one of the operation rate, the set temperature and the compression capacity based on pre-determined comfort levels for the air conditioner.

13. The remote maintenance server of claim 6, wherein the communication unit performs communication with the local controller in a first communication mode, and
the local controller performs communication with the air conditioner in a second communication mode,
wherein the first communication mode is at least one of a mobile communication network, Transmission Control Protocol/Internet Protocol (TCP/IP), Local Area Network (LAN), Wireless LAN, Wi-Fi, Wireless Broadband (Wibro) and World Interoperability for Microwave Access (Wimax), and
the second communication mode is RS-485.

14. The remote maintenance server of claim 1,
wherein the remote controller sets the set temperature at least one maintenance point to a different temperature in a periodically alternating manner during the DR time period based on the alternate operation rate,
wherein the alternate operation rate is 1–(the amount of DR power/the predicted amount of power consumption).

15. A maintenance system for remotely maintaining at least one maintenance point provided with an air conditioner having a plurality of indoor units performing air conditioning and at least one outdoor unit connected to the indoor units to drive the indoor units, the system comprising:
a local controller at the least one maintenance point for executing a control command that sets at least one of the operation rate, the temperature and the compression capacity;
a power meter for collecting power consumption information from the air conditioner at the least one maintenance point; and
a display unit configured to display a maintenance screen for maintaining the at least one maintenance point; and
a remote maintenance server including:
a remote controller configured to control at least one of an operation rate for the plurality of indoor units, a set temperature for the maintenance point, and a compression capacity for a compressor contained in the outdoor unit with a control command, and control the display unit to display control information, which is information associated with at least one of a control status and a control result for the control setting value, for one of the operation rate, the temperature and the compression in a first region on the maintenance screen, and
a communication unit, wherein the communication unit receives a demand response control (DR) request for the at least one maintenance point from a power maintenance system over a wired or wireless network,
wherein the remote controller activates a DR control mode when the DR control request is received, and generates the control command to adjust the set temperature for at least one maintenance point based on a DR control rate when the DR control mode is activated,
wherein the DR control mode is activated during a DR time period, and
wherein the remote controller calculates a predicted amount of power consumption corresponding to the at least one maintenance point during the DR time period, and multiplies an amount of power consumption consumed by the at least one maintenance point from a time point at which the DR control mode is activated to a specific previous time point with the DR control rate to calculate an amount of DR power, and calculates an alternate operation rate based on the predicted amount of power consumption and the amount of DR power.

16. The maintenance system of claim 15, wherein the remote controller controls a control setting value of the control command for the at least one of the operation rate, the set temperature and the compression capacity for a time period specified by a user, and changes the control setting value for the at least one of the operation rate, the set temperature and the compression capacity in a predetermined time interval or in a periodical manner.

17. The maintenance system of claim 15, wherein the remote controller generates a control command for setting at least one of the operation rate, the temperature and the compression capacity, and controls the communication unit to transmit the generated control command to the local controller, and
wherein the local controller adjusts an operation frequency of the compressor to control the compression capacity.

18. The maintenance system of claim 15, wherein the communication unit receives the power consumption information for power consumed by the air conditioner from the power meter and provides power consumption information to the remote controller.

19. The maintenance system of claim 15,
wherein the remote controller sets the set temperature for at least one maintenance point to a different temperature in a periodically alternating manner during the DR time period based on the alternate operation rate, and wherein the alternate operation rate is 1−(the amount of DR power/the predicted amount of power consumption).

20. A remote maintenance method by a remote maintenance server for remotely maintaining at least one maintenance point provided with an air conditioner having a plurality of indoor units performing air conditioning and at least one outdoor unit connected to the indoor units to drive the indoor units, the method comprising:
- a local controller at the least one maintenance point for executing a control command that sets at least one of the operation rate, the temperature and the compression capacity;
- collecting power consumption information from a power meter at the air conditioner at the least one maintenance point in a remote maintenance server;
- display control information, which is information associated with at least one of a control status and a control result for the control setting value, for one of the operation rate, the temperature and the compression in the remote maintenance server;
- generating a control command for setting at least one of the operation rate, the temperature and the compression capacity in the remoter maintenance server;
- transmitting the control command to a local controller at the at least one maintenance point; and
- executing the control command at the local controller by setting the at least one of the operation rate, the temperature and the compression capacity, wherein the remote maintenance server further comprises:
- a communication unit, wherein the communication unit receives a demand response control (DR) request for the at least one maintenance point from a power maintenance system over a wired or wireless network, wherein the remote controller activates a DR control mode when the DR control request is received, and generates the control command to adjust the set temperature for at least one maintenance point based on a DR control rate when the DR control mode is activated, wherein the DR control mode is activated during a DR time period, and wherein the remote controller calculates a predicted amount of power consumption corresponding to the at least one maintenance point during the DR time period, and multiplies an amount of power consumption consumed by the at least one maintenance point from a time point at which the DR control mode is activated to a specific previous time point with the DR control rate to calculate an amount of DR power, and calculates an alternate operation rate based on the predicted amount of power consumption and the amount of DR power.

* * * * *